(12) United States Patent
Yokoya

(10) Patent No.: US 11,188,147 B2
(45) Date of Patent: Nov. 30, 2021

(54) DISPLAY CONTROL METHOD FOR HIGHLIGHTING DISPLAY ELEMENT FOCUSED BY USER

(71) Applicant: Panasonic Intellectual Property Corporation of America, Torrance, CA (US)

(72) Inventor: Mayu Yokoya, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 712 days.

(21) Appl. No.: 15/173,699

(22) Filed: Jun. 5, 2016

(65) Prior Publication Data
US 2016/0363994 A1   Dec. 15, 2016

(30) Foreign Application Priority Data
Jun. 12, 2015   (JP) .............................. JP2015-119380

(51) Int. Cl.
G06F 3/01       (2006.01)
G06F 3/0482    (2013.01)
G06F 3/0484    (2013.01)

(52) U.S. Cl.
CPC ............ G06F 3/013 (2013.01); G06F 3/0482 (2013.01); G06F 3/0484 (2013.01)

(58) Field of Classification Search
CPC .... G06F 3/013; G06F 3/0482; G06F 3/04842; G06F 3/0425; G06F 3/03547;
(Continued)

(56) References Cited

U.S. PATENT DOCUMENTS 5,333,029 A * 7/1994 Uchiyama .............. G02B 7/287
                                                         396/234
5,726,916 A * 3/1998 Smyth .................. A61B 5/0496
                                                         351/210
(Continued)

FOREIGN PATENT DOCUMENTS

CN   102610184 A    7/2012
CN   102834789 A   12/2012
(Continued)

OTHER PUBLICATIONS

R. Ramloll, C. Trepagnier, M. Sebrechts and J. Beedasy, "Gaze data visualization tools: opportunities and challenges," Proceedings. Eighth International Conference on Information Visualisation, 2004. IV 2004., London, UK, 2004, pp. 173-180, doi: 10.1109/IV.2004. 1320141. (Year: 2004).*

(Continued)

*Primary Examiner* — Dino Kujundzic
(74) *Attorney, Agent, or Firm* — Greenblum & Bernstein, P.L.C.

(57) ABSTRACT

A display control method for a display control system includes: acquiring eye gaze information concerning eye gaze of a user; specifying, as a highlight target display element, among at least one display element to be displayed based on data indicating at least one item of information, a display element that has a predetermined positional relationship with the eye gaze of the user indicated by the eye gaze information and that satisfies a certain requirement as a highlight target candidate; and performing display control so that the specified highlight target display element is highlighted.

21 Claims, 12 Drawing Sheets

(58) Field of Classification Search
CPC .... G06F 3/0304; G06F 3/044; G06F 3/04886;
G06F 3/005; G06F 3/0236; G06F 3/147;
G06F 9/451; G06F 1/1639; G06F
3/03543; G06F 3/0395; G06F 3/0484;
G06F 17/212; G06F 17/2765; G06F
2203/04806; G06F 3/017; G06F 3/04817;
G06F 3/016; G06F 3/0481; G06F
2203/04104; G06F 2203/04808; G06F
3/002; G06F 3/048; G06F 3/0485; G06F
3/0488; G06F 3/04815; G06F 3/012;
G06F 16/58; G06F 16/78; G06F 8/38;
H04N 13/383; H04N 5/23212; H04N
5/23219; H04N 21/44222; H04N 13/366;
H04N 13/398; H04N 21/4223; H04N
21/4318; H04N 5/23238
See application file for complete search history.

(56) References Cited

U.S. PATENT DOCUMENTS

| | | | | |
|---|---|---|---|---|
| 5,731,805 A * | 3/1998 | Tognazzini | ............. | G06F 3/013 345/156 |
| 5,844,544 A * | 12/1998 | Kahn | ............. | G06F 3/013 345/156 |
| 6,323,884 B1 * | 11/2001 | Bird | ............. | G06F 3/04812 715/810 |
| 6,400,996 B1 * | 6/2002 | Hoffberg | ............. | G05B 19/0426 370/218 |
| 6,873,314 B1 * | 3/2005 | Campbell | ............. | A61B 3/113 345/156 |
| 7,136,710 B1 * | 11/2006 | Hoffberg | ............. | H04N 21/252 700/83 |
| 7,197,165 B2 * | 3/2007 | Ryan | ............. | G06F 3/013 382/103 |
| 7,538,744 B1 * | 5/2009 | Liu | ............. | G06F 3/013 345/7 |
| 7,556,377 B2 * | 7/2009 | Beymer | ............. | A61B 3/113 351/205 |
| 7,760,910 B2 * | 7/2010 | Johnson | ............. | G06Q 30/02 382/103 |
| 7,809,197 B2 * | 10/2010 | Fedorovskaya | ............. | G06K 9/00255 358/1.14 |
| 7,857,452 B2 * | 12/2010 | Martinez-Conde | ............. | A61B 3/113 351/209 |
| 7,872,635 B2 * | 1/2011 | Mitchell | ............. | A61B 3/113 345/158 |
| 7,881,493 B1 * | 2/2011 | Edwards | ............. | G06K 9/00597 348/78 |
| 8,209,635 B2 * | 6/2012 | Thom | ............. | G06F 1/1686 715/863 |
| 8,219,438 B1 * | 7/2012 | Moon | ............. | G06Q 30/0201 705/7.29 |
| 8,606,595 B2 * | 12/2013 | Udani | ............. | G06Q 10/105 705/2 |
| 8,640,959 B2 * | 2/2014 | Cohen | ............. | H04L 67/04 235/472.01 |
| 8,879,801 B2 * | 11/2014 | Ragland | ............. | G06K 9/0061 382/117 |
| 9,030,505 B2 * | 5/2015 | Ashbrook | ............. | G02B 27/0093 345/690 |
| 9,304,584 B2 * | 4/2016 | Greenspan | ............. | G06F 3/013 |
| 9,380,976 B2 * | 7/2016 | Stack | ............. | A61B 5/162 |
| 9,418,368 B2 * | 8/2016 | Jung | ............. | G06Q 30/02 |
| 9,454,225 B2 * | 9/2016 | Bychkov | ............. | G06F 3/011 |
| 9,495,684 B2 * | 11/2016 | Jung | ............. | A61B 5/04842 |
| 9,510,752 B2 * | 12/2016 | Klin | ............. | A61B 5/16 |
| 9,582,805 B2 * | 2/2017 | Jung | ............. | G06Q 30/02 |
| 9,633,252 B2 * | 4/2017 | Feng | ............. | G06F 3/013 |
| 9,737,209 B2 * | 8/2017 | Gramatikov | ............. | G06K 9/00604 |
| 9,775,554 B2 * | 10/2017 | Jung | ............. | A61B 5/744 |
| 9,851,789 B2 * | 12/2017 | Hayashida | ............. | G06F 3/013 |
| 10,026,000 B2 * | 7/2018 | Sugie | ............. | G06K 9/00845 |
| 10,209,523 B1 * | 2/2019 | Zhang | ............. | G02B 27/0172 |
| 2004/0100567 A1 * | 5/2004 | Miller | ............. | G02B 27/0093 348/239 |
| 2004/0103111 A1 * | 5/2004 | Miller | ............. | G02B 27/017 |
| 2005/0047629 A1 * | 3/2005 | Farrell | ............. | G06F 3/0481 382/117 |
| 2005/0212817 A1 * | 9/2005 | Cannon | ............. | H04N 5/23229 345/619 |
| 2005/0243054 A1 * | 11/2005 | Beymer | ............. | A61B 3/0033 345/156 |
| 2006/0139318 A1 * | 6/2006 | Kariathungal | ............. | G06F 19/321 345/156 |
| 2006/0256083 A1 * | 11/2006 | Rosenberg | ............. | G06F 3/013 345/156 |
| 2007/0066916 A1 * | 3/2007 | Lemos | ............. | A61B 3/113 600/558 |
| 2009/0031240 A1 * | 1/2009 | Hildreth | ............. | G06F 3/011 715/772 |
| 2010/0039618 A1 * | 2/2010 | De Lemos | ............. | A61B 3/113 351/209 |
| 2010/0174586 A1 * | 7/2010 | Berg, Jr. | ............. | G06Q 30/02 705/7.32 |
| 2010/0231504 A1 * | 9/2010 | Bloem | ............. | G06F 3/013 345/156 |
| 2010/0295774 A1 * | 11/2010 | Hennessey | ............. | G06F 3/013 345/156 |
| 2010/0328492 A1 * | 12/2010 | Fedorovskaya | ............. | G06K 9/4671 348/231.2 |
| 2011/0175932 A1 * | 7/2011 | Yu | ............. | G06F 3/013 345/661 |
| 2011/0182472 A1 * | 7/2011 | Hansen | ............. | A61B 3/113 382/103 |
| 2011/0254865 A1 | 10/2011 | Yee et al. | | |
| 2012/0105486 A1 * | 5/2012 | Lankford | ............. | G06F 3/013 345/661 |
| 2012/0146891 A1 * | 6/2012 | Kalinli | ............. | H04N 19/33 345/156 |
| 2012/0203640 A1 * | 8/2012 | Karmarkar | ............. | G06F 1/1686 705/14.66 |
| 2012/0287327 A1 * | 11/2012 | Border | ............. | H04N 5/2254 348/333.09 |
| 2013/0027302 A1 * | 1/2013 | Iwaizumi | ............. | G06F 1/1686 345/158 |
| 2013/0243270 A1 * | 9/2013 | Kamhi | ............. | G06K 9/00281 382/118 |
| 2013/0290993 A1 * | 10/2013 | Cheung | ............. | H04N 21/4143 725/10 |
| 2013/0342525 A1 * | 12/2013 | Benko | ............. | G06T 15/08 345/419 |
| 2014/0002352 A1 * | 1/2014 | Jacob | ............. | G09G 5/00 345/156 |
| 2014/0047560 A1 * | 2/2014 | Meyer | ............. | G06F 21/62 726/28 |
| 2014/0049695 A1 * | 2/2014 | Papish | ............. | H04N 21/44204 348/731 |
| 2014/0143831 A1 * | 5/2014 | Fieweger | ............. | H04L 9/3231 726/3 |
| 2014/0184550 A1 * | 7/2014 | Hennessey | ............. | G06F 3/013 345/173 |
| 2014/0267001 A1 * | 9/2014 | Ratcliff | ............. | G06T 19/00 345/156 |
| 2014/0292639 A1 * | 10/2014 | Kamhi | ............. | G06F 3/012 345/156 |
| 2014/0354533 A1 * | 12/2014 | Swaminathan | ............. | G06F 3/013 345/156 |
| 2014/0372944 A1 * | 12/2014 | Mulcahy | ............. | G06F 3/04815 715/810 |
| 2015/0002650 A1 * | 1/2015 | Yoshimura | ............. | H04N 5/4403 348/78 |
| 2015/0042679 A1 * | 2/2015 | Jarvenpaa | ............. | G06F 3/0304 345/633 |
| 2015/0177830 A1 * | 6/2015 | Feng | ............. | G06F 3/017 345/156 |
| 2015/0181294 A1 * | 6/2015 | Kim | ............. | H04N 21/4622 725/37 |

(56) References Cited

U.S. PATENT DOCUMENTS

| | | | | |
|---|---|---|---|---|
| 2015/0189377 | A1* | 7/2015 | Wheatley | H04N 21/44218 725/12 |
| 2015/0212581 | A1* | 7/2015 | Kawalkar | G06F 3/017 701/3 |
| 2015/0264292 | A1* | 9/2015 | Greene | H04N 5/76 386/248 |
| 2015/0277556 | A1* | 10/2015 | Hayashida | G06F 3/013 382/103 |
| 2015/0294148 | A1* | 10/2015 | Mohanakrishnan | G06K 9/00261 382/103 |
| 2015/0338915 | A1* | 11/2015 | Publicover | H04N 5/44504 345/633 |
| 2016/0095511 | A1* | 4/2016 | Taguchi | A61B 3/0025 351/209 |
| 2016/0165233 | A1* | 6/2016 | Liu | G06T 11/60 382/251 |
| 2016/0191995 | A1* | 6/2016 | Kaliouby | A61B 5/163 725/12 |
| 2016/0342205 | A1* | 11/2016 | Shigeta | A61B 3/113 |
| 2016/0357255 | A1* | 12/2016 | Lindh | G06F 3/013 |
| 2017/0011557 | A1* | 1/2017 | Lee | G06F 3/04842 |
| 2017/0038947 | A1* | 2/2017 | Cook | G06F 3/04842 |
| 2018/0060150 | A1* | 3/2018 | Cunico | G06F 11/0787 |
| 2018/0081171 | A1* | 3/2018 | Park | H04N 19/102 |
| 2018/0235466 | A1* | 8/2018 | Hakoshima | A61B 3/113 |
| 2018/0300943 | A1* | 10/2018 | Lindh | G06T 15/50 |
| 2019/0377830 | A1* | 12/2019 | Weldemariam | G06F 16/9577 |
| 2020/0045363 | A1* | 2/2020 | Nellore | H04N 21/812 |

FOREIGN PATENT DOCUMENTS

| | | |
|---|---|---|
| JP | 2002-169637 | 6/2002 |
| JP | 2004-510239 A | 4/2004 |
| WO | 2002/025637 A1 | 3/2002 |

OTHER PUBLICATIONS

H. Song, Y. Qi, X. Tian and D. Xu, "Navigating and visualizing long lists with fisheye view and graphical representation," Second Workshop on Digital Media and its Application in Museum & Heritages (DMAMH 2007), Chongqing, 2007, pp. 123-128, doi: 10.1109/DMAMH.2007.36. (Year: 2007).*

English Translation of Chinese Search Report dated Sep. 10, 2020 for Chinese Patent Application No. 201610308549.6.

* cited by examiner

FIG. 7

```
<html>
<head>
<title>ABC SYSTEM</title>
  ...
<view size="100">
</view>
</head>
<body>
  ...
<p>
ABOUT ABC SYSTEM ...
  ...
<important view-style="font-size: 200%; text-decoration: underline;">SPECIAL CONDITION :LMN ...
</important>
  ...
XYZ ...
</p>
  ...
<a href="http://www.abc.com/spec.html">LINK TO ABC SYSTEM SPECIFICATIONS</a>
<a href="http://www.xxx.abc.com/xxx.html">LINK TO xxx-RELATED ITEM SITE</a>
  ...
```

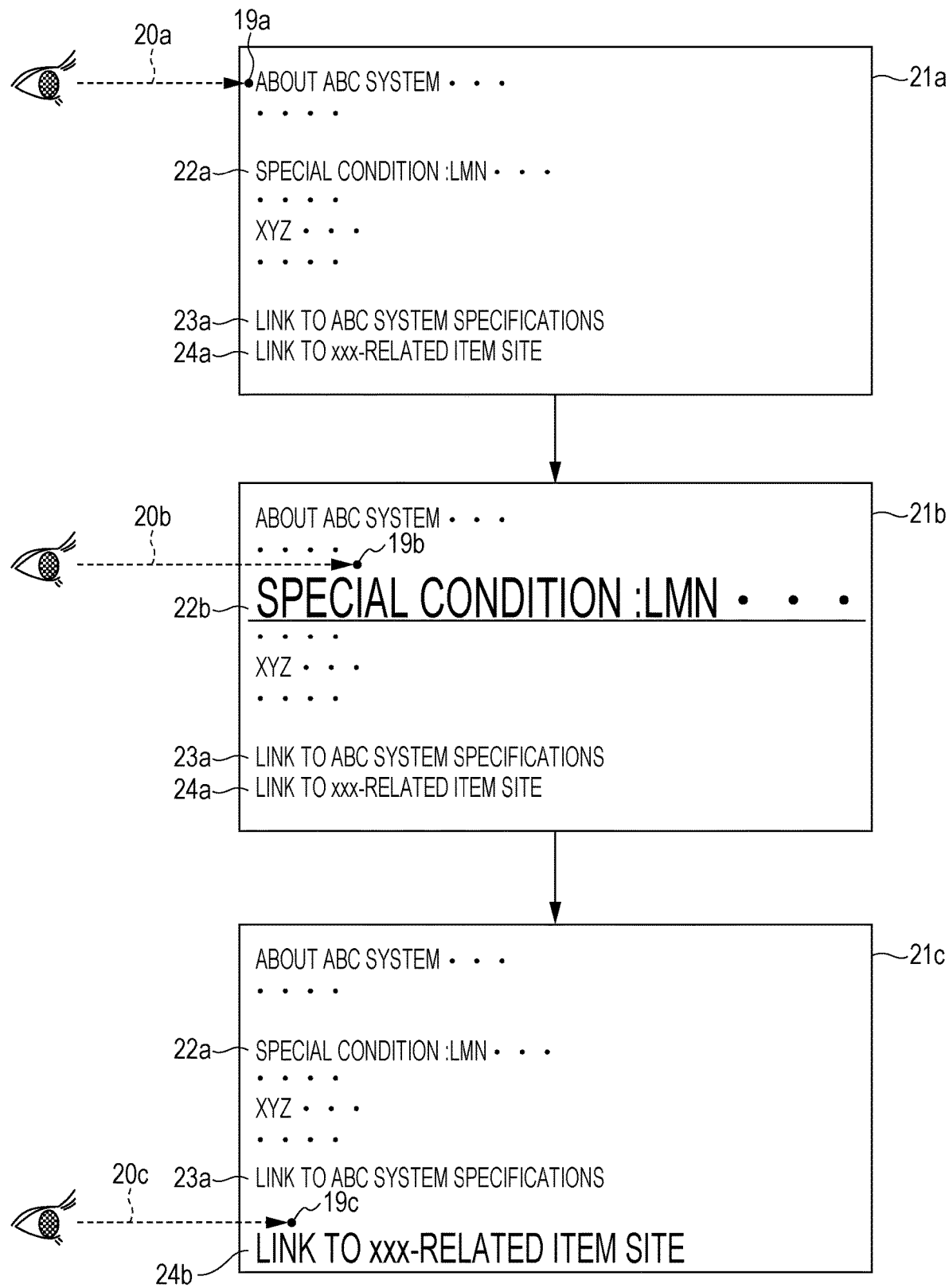

| HIGHLIGHT TARGET CANDIDATE IDENTIFIER | PRIORITY |
|---|---|
| 【 , 】 | 1 |
| [ , ] | 2 |
| ⋮ | ⋮ |

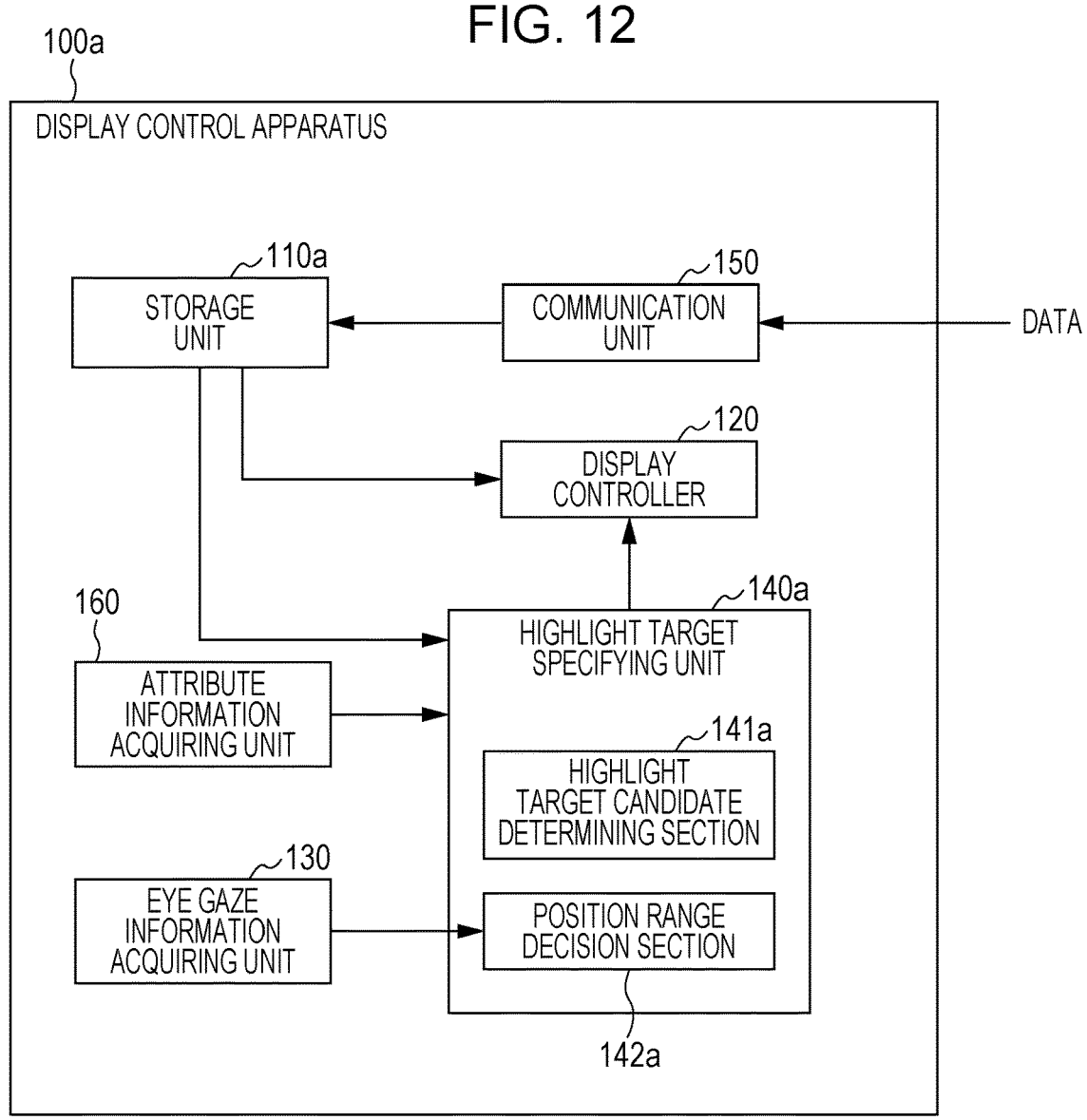

FIG. 14

| VISUAL ACUITY | AGE GROUP | GENDER | RANGE SIZE |
|---|---|---|---|
| 20/25 OR HIGHER | 30'S OR YOUNGER | FEMALE | LARGEST |
| 20/25 OR HIGHER | 30'S OR YOUNGER | MALE | LARGE |
| 20/25 OR HIGHER | 40'S OR OLDER | FEMALE | LARGE |
| 20/25 OR HIGHER | 40'S OR OLDER | MALE | MEDIUM |
| 20/25 OR LOWER | 30'S OR YOUNGER | FEMALE | MEDIUM |
| 20/25 OR LOWER | 30'S OR YOUNGER | MALE | SMALL |
| 20/25 OR LOWER | 40'S OR OLDER | FEMALE | SMALL |
| 20/25 OR LOWER | 40'S OR OLDER | MALE | SMALLEST |

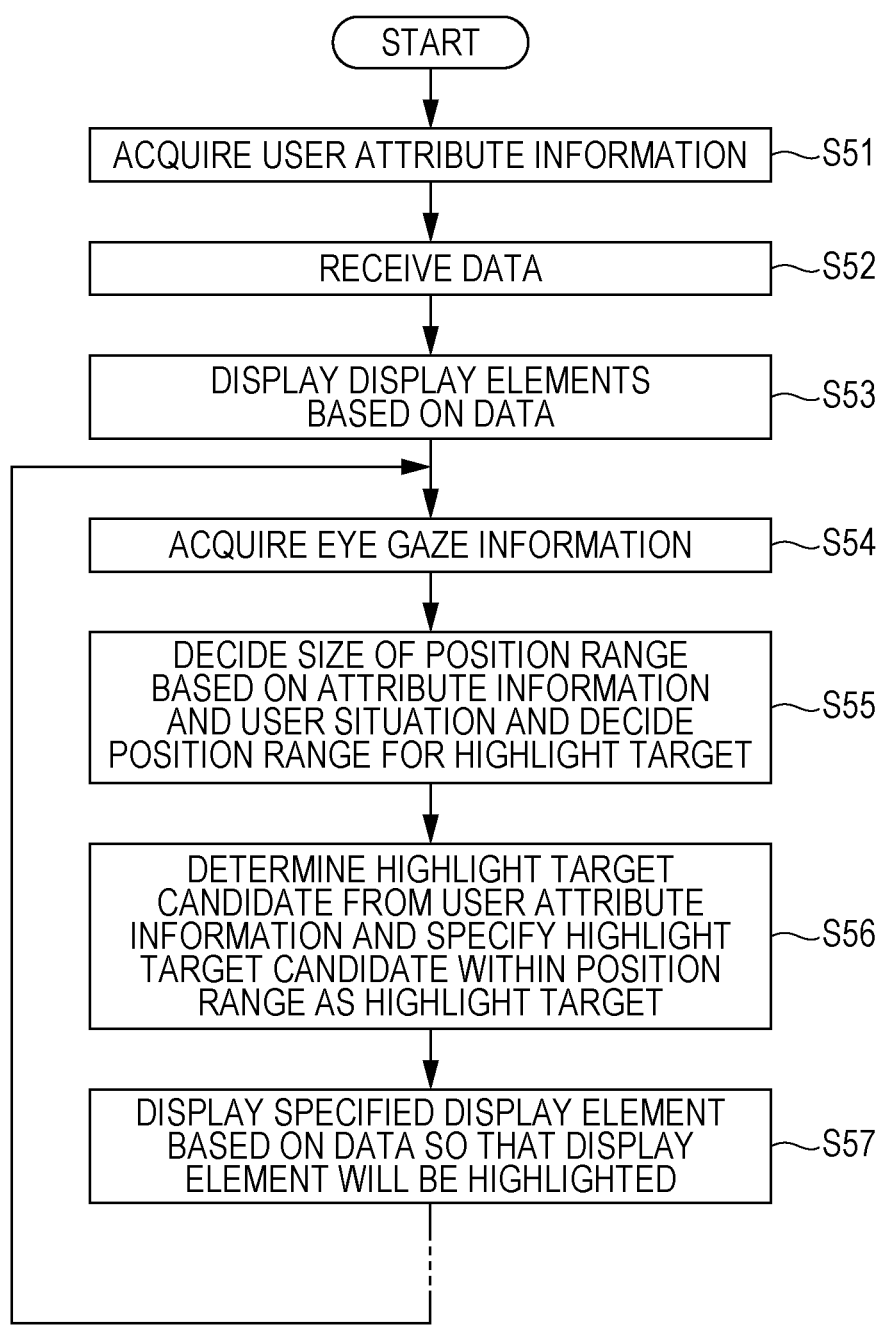

DISPLAY CONTROL METHOD FOR HIGHLIGHTING DISPLAY ELEMENT FOCUSED BY USER

BACKGROUND

1. Technical Field

The present disclosure relates to a display technology for data such as documents.

2. Description of the Related Art

Hitherto, a computer performs display control so that, based on data such as a document indicating information to be displayed, a set of display elements representing this information, for example, an image, will be displayed on a display. This display control is performed by using an application program, a web browser, and another program. In this case, if many display elements (information) are displayed on a display, a user may find it difficult to read. In view of such a situation, in order to make display elements easy to read when a user is viewing a webpage, a technology (document display mode converting device) for enlarging characters included in a region (webpage region) focused by the user, on the basis of user eye gaze information, is known (see, for example, Japanese Unexamined Patent Application Publication No. 2002-169637).

SUMMARY

In the technology disclosed in the above-described publication, however, if a user focuses on a certain item of information such as characters, this item of information is highlighted (enlarged) automatically. Accordingly, if a user does not pay attention to a display element representing important information, the user does not notice this display element and overlooks the important information.

One non-limiting and exemplary embodiment provides a display control method that makes a user less likely to overlook information to be focused.

In one general aspect, the techniques disclosed here feature a display control method for a display control system. The display control method includes: acquiring eye gaze information concerning eye gaze of a user; specifying, as a highlight target display element, among at least one display element to be displayed based on data indicating at least one item of information, a display element that has a predetermined positional relationship with the eye gaze of the user indicated by the eye gaze information and that satisfies a certain requirement as a highlight target candidate; and performing display control so that the specified highlight target display element is highlighted.

According to an aspect of the present disclosure, it is possible to make a user less likely to overlook information to be focused.

It should be noted that general or specific embodiments may be implemented as a system, an apparatus, an integrated circuit, a computer program, a computer-readable recording medium such as a compact disc read only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 illustrates an example of display data received and displayed by a display control apparatus;

FIG. 8 illustrates an example of the transition of a screen (display surface) displayed by the display control apparatus according to the first embodiment;

FIG. 12 is a block diagram of the functional configuration of a display control apparatus according to a third embodiment;

FIG. 13 illustrates an example of attribute information used in the display control apparatus according to the third embodiment;

FIG. 14 illustrates an example of a range decision table used in the display control apparatus according to the third embodiment; and FIG. 15 is a flowchart illustrating an example of display control processing according to the third embodiment.

DETAILED DESCRIPTION

Figure 1:
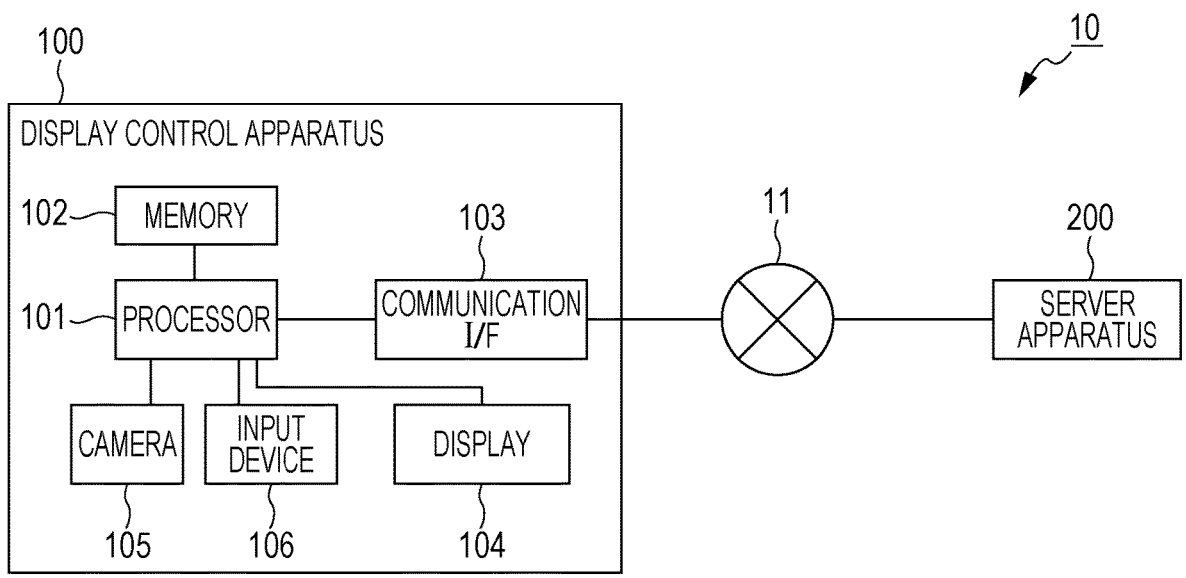
FIG. 1 illustrates the overall configuration of a display control system according to a first embodiment.

A display control method according to an aspect of the present disclosure is a display control method for a display control system. The display control method includes: acquiring eye gaze information concerning eye gaze of a user; specifying, as a highlight target display element, among at least one display element to be displayed based on data indicating at least one item of information, a display element that has a predetermined positional relationship with the eye gaze of the user indicated by the eye gaze information and that satisfies a certain requirement as a highlight target candidate; and performing display control so that the specified highlight target display element will be highlighted. With this configuration, it is possible to make a user less likely to overlook information to be focused. For example, by determining a suitable requirement for which a display element may be selected as a highlight target candidate, a specific item of the display content (information represented by a display element) to be focused by a user can be noticeably displayed so as to make it easy for the user to recognize such an item of information.

The display control system may perform control so that the at least one display element is displayed on a display surface. In the acquiring of the eye gaze information, a gaze point position indicating a position on the display surface at which the user is gazing may be detected as the eye gaze information. In the specifying of the highlight target display element, it may be determined whether the at least one display element has the predetermined positional relationship, based on a display position of the at least one display element on the display surface and the detected gaze point position. In the performing of display control, the specified highlight target display element may be displayed in a first display mode on the display surface so as to be highlighted and the at least one display element other than the specified highlight target display element is displayed in a second display mode on the display surface. The second display mode is different from the first display mode. With this configuration, a display element to be focused (for example, a display element representing important information) may be noticeably displaced according to the positional relationship between the display element and the gaze point of the user on the display surface, such as the screen of a display. It is thus possible to make a user less likely to overlook information to be focused.

The display control method may further include deciding a position range based on the detected gaze point position. In the specifying of the highlight target display element, it may be determined that, among the at least one display element, a display element located within the decided position range is a display element that has the predetermined positional relationship. With this configuration, it is possible to make it easy for a user to recognize information to be focused (for example, important information) located within a region of a certain range (position range) related to the gaze point of the user. In this case, not all display elements are highlighted, but a display element to be highlighted is restricted by a certain requirement for which a display element may be selected as a highlight target candidate and by the position of the gaze point of the user. Thus, the processing load necessary for initially displaying a set of display elements (the processing load for highlighting a display element) by the display control system may be relatively reduced.

The data may include information concerning a range specifying element for specifying a size of the position range, and in the deciding of the position range, the position range may be decided based on the range specifying element. With this configuration, a provider or a creator of the data may be able to specify, within the data, the size of the position range used for highlighting a display element to be focused (for example, a display element representing important information). Then, when the gaze point of a user who is a viewer of the data is located within the specified size of the range with respect to this display element, this display element is highlighted.

In the deciding of the position range, the position range may be decided based on layout information indicating an arrangement of the at least one display element on the display surface. With this configuration, the position range may be decided according to the layout such as the spacing in character strings in data such as a document. For example, the size of the position range may be determined to be larger as there are more spaces in character strings.

In the deciding of the position range, the position range may be decided based on attribute information concerning an attribute of the user. User attributes such as the gender, age, and visual acuity may correlate with the range of the field of view. Accordingly, the size of the position range may be decided according to the attributes of a user. For example, the size of the position range may be determined to be larger as the range of the field of view estimated from the attributes of the user is larger. Then, when the gaze point of the user is located within the specified size of the range with respect to a display element to be focused, this display element is highlighted. It is thus possible to make a user less likely to overlook a display element to be focused.

In the deciding of the position range, the position range may be decided based on a situation of the user. It is thus possible to effectively highlight a display element according to the situation of the user, for example, whether the user is tired or whether the user is in a hurry.

The data may include information concerning an important information specifying element for specifying important information, which is an item of information to be focused among the at least one item of information indicated by the data. In the specifying of the highlight target display element, it may be determined whether the at least one display element satisfies the certain requirement, based on whether the at least one display element represents important information specified by the important information specifying element. This makes it possible for a provider or a creator of the data to specify important information to be focused by the user who is a viewer of the data.

In the specifying of the highlight target display element, it may be determined whether the at least one display element satisfies the certain requirement, based on information concerning the content of the data. Information to be focused by a user (for example, important information) greatly varies according to the content of data. Accordingly, with this display control method, it is possible to make a user less likely to overlook information to be focused according to the content of data.

The data may be a document including link information for relating the document to an external document. In the specifying of the highlight target display element, it may be determined whether, among the at least one display element, a display element representing the link information satisfies the certain requirement, based on the number of visits to the external document which is related to the document by the link information. With this configuration, it is possible to make a user less likely to overlook link information for linking a document to an external document which is viewed by relatively many users.

In the specifying of the highlight target display element, it may be determined whether the at least one display element satisfies the certain requirement, based on attribute information concerning an attribute of the user. Generally, people being classified under the same group regarding a certain attribute, such as the gender, age, and hobbies, are highly interested in the same kind of information. Accordingly, by making a determination as to whether a display element satisfies the certain requirement as a highlight target candidate based on attribute information, it is possible to effectively make a user less likely to overlook information to be focused.

In the specifying of the highlight target display element, it may be determined whether the at least one display element satisfies the certain requirement, based on a document viewed by the user in the past. Documents viewed by a user in the past may contain items in which the user is interested. Accordingly, with this display control method, it is possible to make a user less likely to overlook information to be focused (for example, important information in which the user is highly interested).

In the specifying of the highlight target display element, it may be determined whether the at least one display element satisfies the certain requirement, based on a situation of the user. With this configuration, it is possible to effectively restrict information to be focused by a user according to the situation of the user, for example, whether the user is tired or whether the user is in a hurry.

In the performing of display control, the specified highlight target display element may be highlighted by displaying the specified highlight target display element in color and by displaying the at least one display element other than the specified highlight target display element monochromatically.

In the performing of display control, the specified highlight target display element may be highlighted by decreasing a level of resolution of the at least one display element other than the specified highlight target display element to a lower level than a level of resolution of the specified highlight target display element.

In the performing of display control, the specified highlight target display element may be highlighted by making an edge of the at least one display element other than the specified highlight target display element less sharp.

The data may include video information indicating video. The display control method my further comprising performing control so that a video display object which includes a playback region for playing back the video indicated by the video information and which serves as a display element representing the video information will be displayed based on the data. In the display control method, if the specified highlight target display element is the video display object, the specified highlight target display element may be highlighted by playing back the video in the playback region of the video display object. With the above-described configurations, it makes it possible for a user to speedily find information to be focused.

The data may indicate region information concerning a display region for displaying information. The display control method my further comprising performing control so that a display region object including the display region and serving as a display element representing the region information will be displayed based on the data. In the display control method, if the specified highlight target display element is the display region object, the specified highlight target display element may be highlighted by insertion of information corresponding to attribute information concerning an attribute of the user into the display region of the display region object. This makes it possible for a user to easily obtain information in which the user is highly interested.

A display control apparatus according to an aspect of the present disclosure includes: one or more memories; and circuitry which, in operation, acquires data indicating at least one item of information, acquires eye gaze information concerning eye gaze of a user, specifies, as a highlight target display element, among at least one display element to be displayed based on the data, a display element that has a predetermined positional relationship with the eye gaze of the user indicated by the eye gaze information and that satisfies a certain requirement as a highlight target candidate, and performs display control so that the specified highlight target display element is highlighted. With this configuration, it is possible to make a user less likely to overlook information to be focused. For example, by determining a suitable requirement for which a display element may be selected as a highlight target candidate, a specific item of the display content (information represented by a display element) to be focused by a user can be noticeably displayed so as to make it easy for the user to recognize such an item of information.

A non-transitory computer-readable recording medium according to an aspect of the present disclosure is a non-transitory computer-readable recording medium storing a control program for causing a computer to execute a display control method. The display control method includes: acquiring eye gaze information concerning eye gaze of a user; specifying, as a highlight target display element, among at least one display element to be displayed based on data indicating at least one item of information, a display element that has a predetermined positional relationship with the eye gaze of the user indicated by the eye gaze information and that satisfies a certain requirement as a highlight target candidate; and performing display control so that the specified highlight target display element is highlighted. By installing the control program into a computer by using this non-transitory computer-readable recording medium, the computer may serve as a display control apparatus which makes a user less likely to overlook information to be focused.

It should be noted that general or specific embodiments may be implemented as a system, a method, an integrated circuit, a computer program, a computer-readable recording medium such as a CD-ROM, or any selective combination thereof.

A display control system including a display control apparatus according to embodiments will be described below with reference to the accompanying drawings. All of the embodiments described below illustrate general or specific examples. Numeric values, components, arrangement positions thereof, connection states thereof, steps, and order of steps illustrated in the following embodiments are only examples, and are not described for limiting the present disclosure. Among the components illustrated in the following embodiments, components that are not recited in the independent claims will be described as optional components. In all the drawings, for facilitating the understanding, the components are only schematically shown and are not necessarily shown precisely.

First Embodiment

A display control system that implements a display control method according to an embodiment of the present disclosure will be described below with reference to the drawings.

(Configuration)

FIG. 1 illustrates the overall configuration of a display control system 10 according to a first embodiment.

The display control system 10 is a system that implements a display control method for performing display control so that, based on data indicating information to be displayed, display elements representing this information will be displayed and so that a display element representing an item of information to be focused by a user will be highlighted. As shown in FIG. 1, the display control system 10 includes a display control apparatus 100 and a server apparatus 200 that can communicate with each other via a network 11. The network 11 includes a wide area network, for example, the Internet, but may be a local area network (LAN).

Examples of the display control apparatus 100 are a personal computer, a tablet, a smartphone, and other computers (information processing apparatus). As shown in FIG. 1, the display control apparatus 100 includes, as hardware elements, a processor (microprocessor) 101, a memory 102, a communication interface (I/F) 103, a display 104, a camera 105, and an input device 106.

Figure 2:
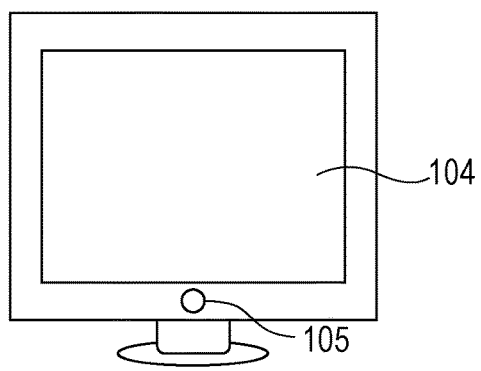
FIG. 2 illustrates an example of the positional arrangement of a camera.

The memory 102 includes a ROM in which programs and data are stored in advance and a random access memory (RAM) used for storing data when a program is executed. The memory 102 may include a non-volatile memory. The processor 101 controls components such as the communication I/F 103, the display 104, and the camera 105 by executing a control program stored in the memory 102 so as to execute various processing operations. The communication I/F 103 is a communication circuit for communicating with the server apparatus 200 via the network 11 by using a wireless or wired medium. The display 104 is a device, for example, a liquid crystal display, which displays display elements on a screen (display surface) of the display 104. Display elements are so-called display objects, such as graphics, characters, photographs, drawings, tables, and other image data representing a certain piece of information. The camera 105 is a sensor for performing imaging for detecting the eye gaze of a person (user) looking at the display 104. An example of the positional arrangement of the display 104 and the camera 105 is shown in FIG. 2. The camera 105 is located at a position at which it can image a person facing the screen (display surface) of the display 104. The camera 105 includes, for example, infrared light emitting diodes (LEDs), and irradiates a user with infrared light so as to take an image showing the position of light reflected by the cornea and the position of the eye pupil by using an infrared image sensor. The display control apparatus 100 includes an eye gaze detection mechanism. This eye gaze detection mechanism detects the eye gaze of a user based on the imaging results obtained by the camera 105, for example, based on the position of light reflected by the cornea and the position of the pupil, so as to generate eye gaze information indicating the eye gaze of the user as the detection results. The input device 106 is a device, such as a keyboard, a pointing device, and a touch panel, which receives user operations. The display control apparatus 100 may include, not only the memory 102, but also an auxiliary storage device, such as a hard disk drive, used for storing data.

By executing an operating system (OS) and an application program by using the processor 101, the display control apparatus 100 performs various functions, such as a document displaying and editing function and a web browsing function. When performing a function such as a document displaying function, the application program interprets data (for example, a document) indicating information according to predetermined rules, such as a data format type, a character map, and the specifications of a webpage description language, so as to specify display elements to be displayed on the screen (display surface).

The server apparatus 200 is a computer that is capable of executing processing in cooperation with the display control apparatus 100, and includes, for example, a processor, a memory, and a communication I/F. The server apparatus 200 has a mail server function or a web server function. If the server apparatus 200 has a web server function, it manages webpages and sends data concerning a webpage in response to a request from the display control apparatus 100 having a browser function. The server apparatus 200 also has a function of managing the number of visits to each webpage (the number of requests for data in each webpage) from each browser and sending information concerning the number of visits to the display control apparatus 100 in response to a request from the display control apparatus 100.

Figure 3:
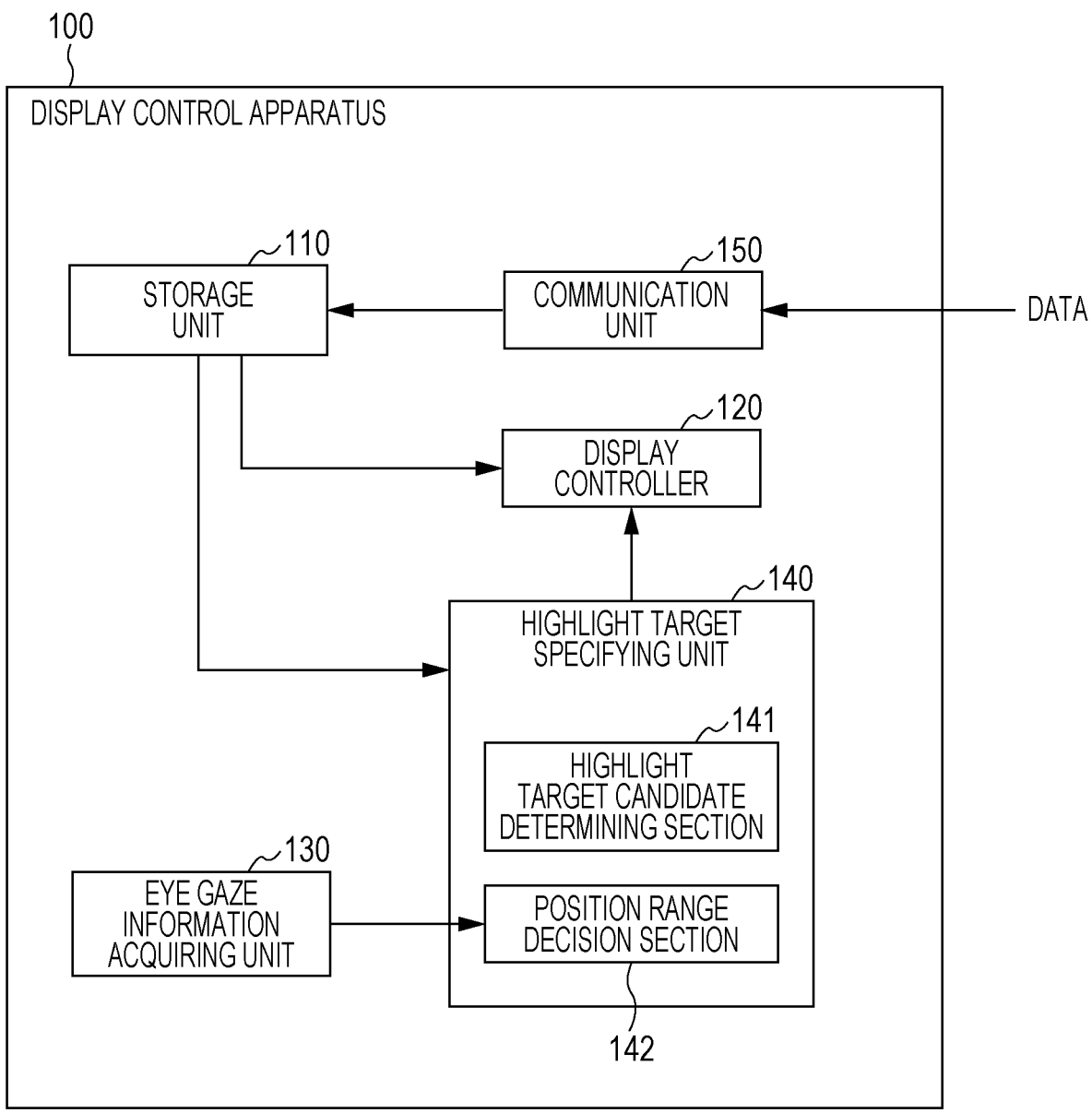
FIG. 3 is a block diagram of the functional configuration of a display control apparatus according to the first embodiment.

Functional elements of the display control apparatus 100 will now be described below with reference to FIG. 3. FIG. 3 is a block diagram of the functional configuration of the display control apparatus 100.

As shown in FIG. 3, the display control apparatus 100 includes, as functional elements, a storage unit 110, a display controller 120, an eye gaze information acquiring unit 130, a highlight target specifying unit 140, and a communication unit 150.

The storage unit 110 is realized by part of the memory 102. The storage unit 110 has a function of storing data used for displaying one or more items of information, for example, it stores data obtained by the communication unit 150 from the server apparatus 200. Information indicated by data represents a certain meaning or concept. The display control apparatus 100 displays, based on such data, display elements representing this information on the display surface, thereby enabling a user to visually recognize this information. Examples of data indicating one or more items of information are HyperText Markup Language (HTML) documents written in an HTML for webpages, document files for a specific application program, such as a word-processing program for displaying and editing character strings, emails, map data, and electronic books. In the first embodiment, HTML documents will mainly be taken as an example of data indicating information.

The display controller 120 has a function of performing display control so that display elements will be displayed on a screen based on data stored in the storage unit 110 and so that a display element specified by the highlight target specifying unit 140 will be highlighted on the screen. The display controller 120 is realized by the processor 101 executing the control program and the display 104.

More specifically, the display controller 120 performs display control so that a display element will be displayed on the display surface (the screen of the display 104) in a specific display mode. For example, a display element is more noticeable when it is highlighted on the screen than that when it is not highlighted. A display element, which is a character string constituted by one or more characters, may be displayed in the following manner. The display controller 120 displays a display element specified by the highlight target specifying unit 140 (that is, a display element to be highlighted, which may also be simply referred to as a "highlight target display element") in a first display mode, for example, in a larger font size than a predetermined normal font size. The display controller 120 also displays display elements which are not specified by the highlight target specifying unit 140 (for example, display elements around a highlight target display element) in a second display mode, for example, in a normal font size, which is less noticeable than a larger font size in the first display mode. If a display element specified by the highlight target specifying unit 140 is displayed with high resolution in the first display mode, the other display elements may be displayed with low resolution in the second display mode. Among candidate display elements to be highlighted (that is, candidate display elements to be focused), which may also be simply referred to as "highlight target candidates", a highlight target display element is a display element that has a predetermined positional relationship with the eye gaze of a user.

The eye gaze information acquiring unit 130 has a function of acquiring eye gaze information from the eye gaze detection mechanism within the display control apparatus 100. The eye gaze detection mechanism detects the eye gaze of a user from the imaging results obtained by the camera 105 and generates eye gaze information concerning the eye gaze of the user. The eye gaze information indicates the direction of the eye gaze of a user and the positional relationship between the display surface (the screen of the display 104) and the user eye, or indicates a gaze point of the user on the display surface. The eye gaze information acquiring unit 130 detects a position of the gaze point of the user on the display surface, on the basis of the eye gaze information concerning the eye gaze of the user. That is, if the eye gaze detection mechanism determines a gaze point of the user on the display surface by calculation and generates eye gaze information indicating the gaze point of the user, the eye gaze information acquiring unit 130 acquires this gaze point from the eye gaze information. If the eye gaze information generated by the eye gaze detection mechanism indicates the direction of the eye gaze of the user and the positional relationship between the display surface and the user eye, the eye gaze information acquiring unit 130 determines the gaze point of the user by calculation, on the basis of the eye gaze information. The eye gaze information acquiring unit 130 is realized by the processor 101 executing the control program.

The highlight target specifying unit 140 has a function of specifying a highlight target display element which represents information to be focused by a user. More specifically, the highlight target specifying unit 140 has a function of specifying, among display elements displayed by the display controller 120 based on data, a display element that has a predetermined positional relationship with the eye gaze of a user and that satisfies a certain requirement as a highlight target candidate, by referring to the eye gaze information acquired by the eye gaze information acquiring unit 130. The display element to be specified by the highlight target specifying unit 140 is not restricted to a display element which is already displayed by the display controller 120, but may be a display element which will be displayed by the display controller 120 in response to a user operation. A display element which is not a highlight target candidate is not a highlight target display element. A certain requirement as a highlight target candidate is not a requirement that is determined by the positional relationship with the eye gaze of a user, but a requirement that defines, for example, a display element representing important information. For example, if a webpage is displayed based on data, such as an HTML document, obtained by the communication unit 150 from the server apparatus 200, a creator of the HTML document may include in the data information (such as a highlight target candidate tag) for identifying whether a certain display element is a highlight target candidate. In this case, a display element identified as a highlight target candidate by a highlight target candidate tag is a display element that satisfies a certain requirement as a highlight target candidate. A display element that has a predetermined positional relationship with the eye gaze of a user is, for example, a display element which has a predetermined positional relationship with the position of the gaze point of the user on the display surface. For example, a display element that has a predetermined positional relationship with the position of the gaze point of the user is a display element within a certain size of a rectangular region including the gaze point of the user or a display element located within a circle of a certain radius around the gaze point of the user.

The highlight target specifying unit 140 is realized by the processor 101 executing the control program and the communication UF 103. For implementing the above-described function of specifying a highlight target display element which represents information to be focused by a user, the highlight target specifying unit 140 includes a highlight target candidate determining section 141 and a position range decision section 142 as examples of the functional elements.

The highlight target candidate determining section 141 serves the function of determining a display element that satisfies a certain requirement as a highlight target candidate. More specifically, the highlight target candidate determining section 141 determines whether a display element is a display element that satisfies a certain requirement as a highlight target candidate, on the basis of whether the display element represents important information which is specified by an important information specifying element. The important information specifying element is data for specifying information to be focused by a user, for example, a tag for specifying important information. For the convenience of description, it is assumed that, as a tag for specifying information to be focused (important information), an important tag is added to an HTML which describes a webpage. An important tag is a tag which uses important information to be specified as an element and a display mode to be specified (such as a bold type, color, size, and other styles) as an attribute. The highlight target candidate determining section 141 determines that a display element which represents important information specified by an important tag in an HTML document is a display element that satisfies a certain requirement as a highlight target candidate. The display controller 120 specifies a display mode for highlighting a display element by using the attribute of the important tag.

The highlight target candidate determining section 141 determines whether a display element representing link information in an HTML document, that is, a display element representing information specified by an A tag (anchor tag), satisfies a certain requirement as a highlight target candidate, on the basis of the number of visits to another document (external document) related to the HTML document by the link information. More specifically, the highlight target candidate determining section 141 obtains, from the server apparatus 200, the number of hits to a webpage of an HTML document indicated by a uniform resource identifier (URI) specified by an A tag, and if the number of hits (that is, the number of visits to the webpage of the HTML document) exceeds a predetermined threshold (for example, 10000), the highlight target candidate determining section 141 determines that this display element satisfies a certain requirement. If the number of hits does not exceed the predetermined threshold, the highlight target candidate determining section 141 determines that this display element does not satisfy a certain requirement. For example, it is assumed that a display element is a web banner (an image of link information indicating a link to an advertising webpage) in a webpage defined by an HTML document. In this case, if the number of hits to the advertising website represented by this web banner exceeds the predetermined threshold, the highlight target candidate determining section 141 determines that this web banner is a highlight target candidate that satisfies a certain requirement as a highlight target candidate.

The position range decision section 142 serves the function of specifying a display element that has a predetermined positional relationship with the eye gaze (gaze point) of a user, on the basis of a detection result of the position of the gaze point of the user. That is, the position range decision section 142 decides a position range on the basis of the position of a gaze point of the user on the display surface (the screen of the display 104), and specifies a display element that is located within the decided position range among display elements that satisfy a certain requirement as a highlight target candidate. The position range is a region used for restricting highlight target display elements based on a condition concerning the display positions of display elements. For deciding a position range based on the position of the gaze point of the user, any procedure may be taken. The size and the configuration of a position range may be decided first, and then, the position of the position range may be decided. Alternatively, the configuration, size, and position of a position range may be decided together. The position range decision section 142 decides, for example, a rectangular region of a certain size (for example, a width of 10 cm and a height of 3 cm) around the gaze point of the user as the position range.

The communication unit 150 is realized by the processor 101 executing the control program and the communication I/F 103, and has a function of receiving data (such as an HTML document) from the server apparatus 200 via the network 11 and storing the received data in the storage unit 110.

(Operation)

An example of the operation performed by the display control system 10 configured as described above will be discussed below.

Figure 4:
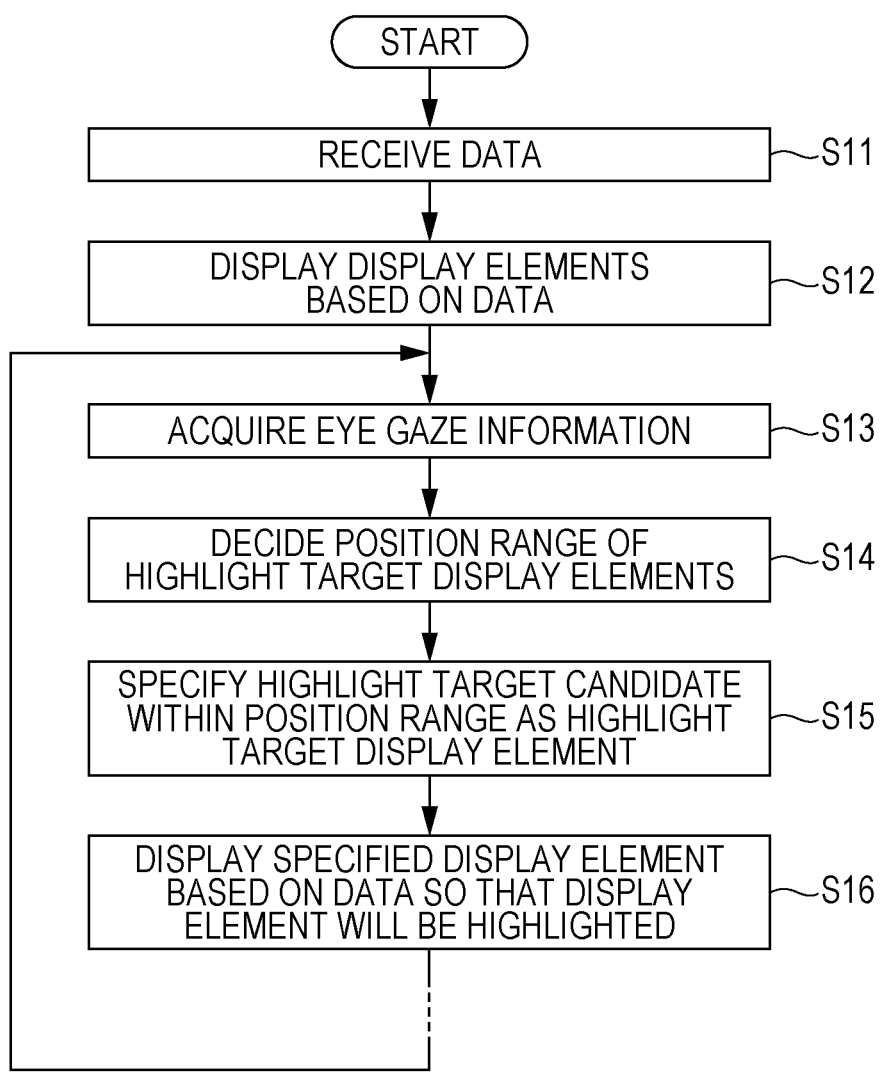
FIG. 4 is a flowchart illustrating an example of display control processing according to the first embodiment.

FIG. 4 is a flowchart illustrating an example of display control processing executed by the display control apparatus 100. The operation of the display control apparatus 100 will be described below with reference to FIG. 4.

In step S11, by performing a browsing function in accordance with a user operation received by the input device 106, the display control apparatus 100 receives data (HTML document describing a webpage) by the communication unit 150 from the server apparatus 200, and stores the received data in the storage unit 110.

In step S12, the display controller 120 interprets the data (HTML document) stored in the storage unit 110 and displays display elements on the screen of the display 104 on the basis of the HTML document. The display controller 120 decides the positional arrangement (layout) of display elements, which represent the information indicated by the HTML document, on the display surface, and then displays the display elements according to the decided layout. If values for specifying the position and style of each display element are included in the HTML document, the display controller 120 specifies the position and style of each display element by reflecting these values in predetermined default values. As a result of displaying the display elements in step S12, a user is able to view a webpage constituted by a set of multiple display elements displayed on the screen of the display 104.

In step S13, the eye gaze information acquiring unit 130 acquires eye gaze information from the eye gaze detection mechanism disposed within the display control apparatus 100, and detects a gaze point of the user on the display surface.

Then, in step S14, the position range decision section 142 decides a position range for restricting highlight target display elements in accordance with the position of the detected gaze point of the user. The position range decision section 142 decides, for example, a rectangular region of a certain size around the gaze point on the screen at which the user is gazing, as the position range.

Then, in step S15, as a result of the highlight target candidate determining section 141 executing highlight target candidate determining processing (discussed later), the highlight target specifying unit 140 determines, among the display elements located within the position range, a display element that satisfies a certain requirement as a highlight target candidate. In this manner, the highlight target specifying unit 140 specifies a highlight target display element, that is, a highlight target candidate display element within the position range.

Then, in step S16, the display controller 120 determines a display mode based on the data so as to highlight the display element specified by the highlight target specifying unit 140, and then displays the display element in accordance with the determined display mode. With this operation, the display element specified by the highlight target specifying unit 140 is displayed (highlighted) in a first display mode, while display elements that are not specified by the highlight target specifying unit 140 are displayed in a second display mode. The specified display element is displayed more noticeably in the first display mode, while the unspecified display elements are displayed less noticeably in the second display mode. Steps S13 through S16 are repeated, so that a highlight target display element is changed in accordance with the movement of the gaze point of the user, thereby switching a display element to be highlighted. The display controller 120 may initially display all the display elements on the screen of the display 104 in the second display mode in step S12, and then may change the display mode of only a highlight target display element to the first display mode and may display this display element in the first display mode in step S16. In this case, when a display element highlighted in the first display mode is determined to be a display element which is not a highlight target, the display mode of such a display element may be changed to the second display mode.

Figure 5:
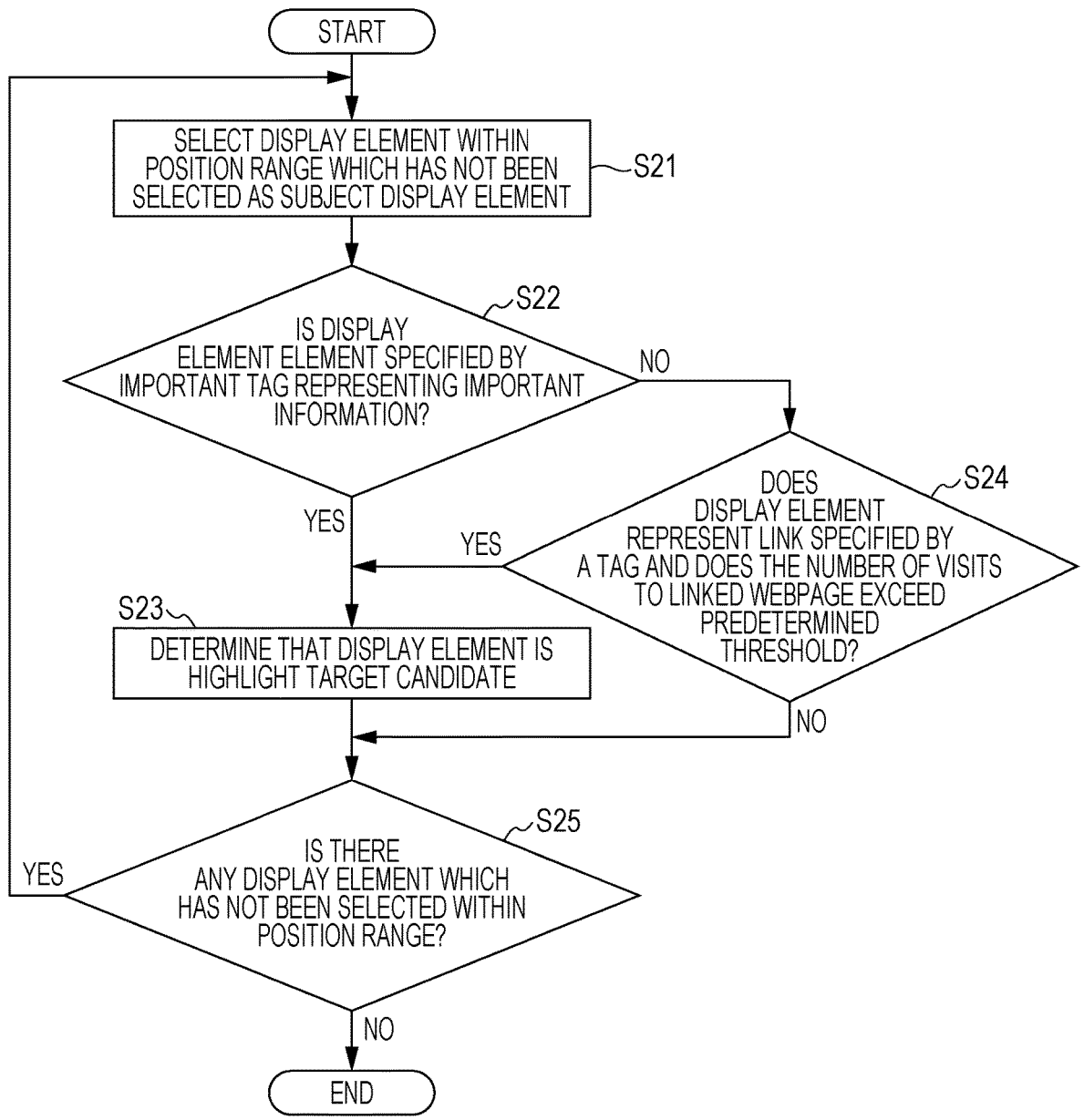
FIG. 5 is a flowchart illustrating an example of highlight target candidate determining processing according to the first embodiment.

A specific example of specifying of a highlight target candidate in step S15 will be discussed below with reference to FIG. 5. FIG. 5 is a flowchart illustrating an example of highlight target candidate determining processing for determining a highlight target candidate.

In step S21, the highlight target candidate determining section 141 selects a display element which is displayed within the position range decided in step S14 and which has not been selected as a subject display element.

Then, in step S22, the highlight target candidate determining section 141 determines whether the subject display element is an element specified by an important tag which represents important information in the HTML document. If the result of step S22 is YES, the highlight target candidate determining section 141 proceeds to step S23 to determine that the subject display element is a highlight target candidate that satisfies a certain requirement.

If the highlight target candidate determining section 141 determines in step S22 that the subject display element is not an element specified by an important tag, it proceeds to step S24 to determine whether the subject display element represents link information specified by an A tag and whether the number of hits (the number of visits) to a webpage indicated by the link information exceeds a predetermined threshold (for example, 10000). If the result of step S24 is YES, the highlight target candidate determining section 141 determines in step S23 that the subject display element is a highlight target candidate that satisfies a certain requirement. Concerning the number of visits to the webpage indicated by the link information, the highlight target candidate determining section 141 may request the server apparatus 200 to send information concerning the number of visits. If the subject display element is not an element specified by an important tag (NO in step S22) and if it is not an element representing link information specified by an A tag, or even if it is an element representing link information specified by an A tag, if the number of visits to the website indicated by the link information does not exceed the predetermined threshold (NO in step S24), the highlight target candidate determining section 141 determines that the display element is not a highlight target candidate.

In step S25, the highlight target candidate determining section 141 determines whether there is a display element within the position range which has not been selected as a subject display element. If the result of step S25 is YES, the highlight target candidate determining section 141 returns to step S21 to repeatedly select a display element and then to repeatedly determine whether the selected display element is a highlight target candidate.

As a result of executing this highlight target candidate determining processing, a display element within a position range that satisfies a certain requirement as a highlight target candidate is determined and is specified as a highlight target display element in step S15.

Figure 6:
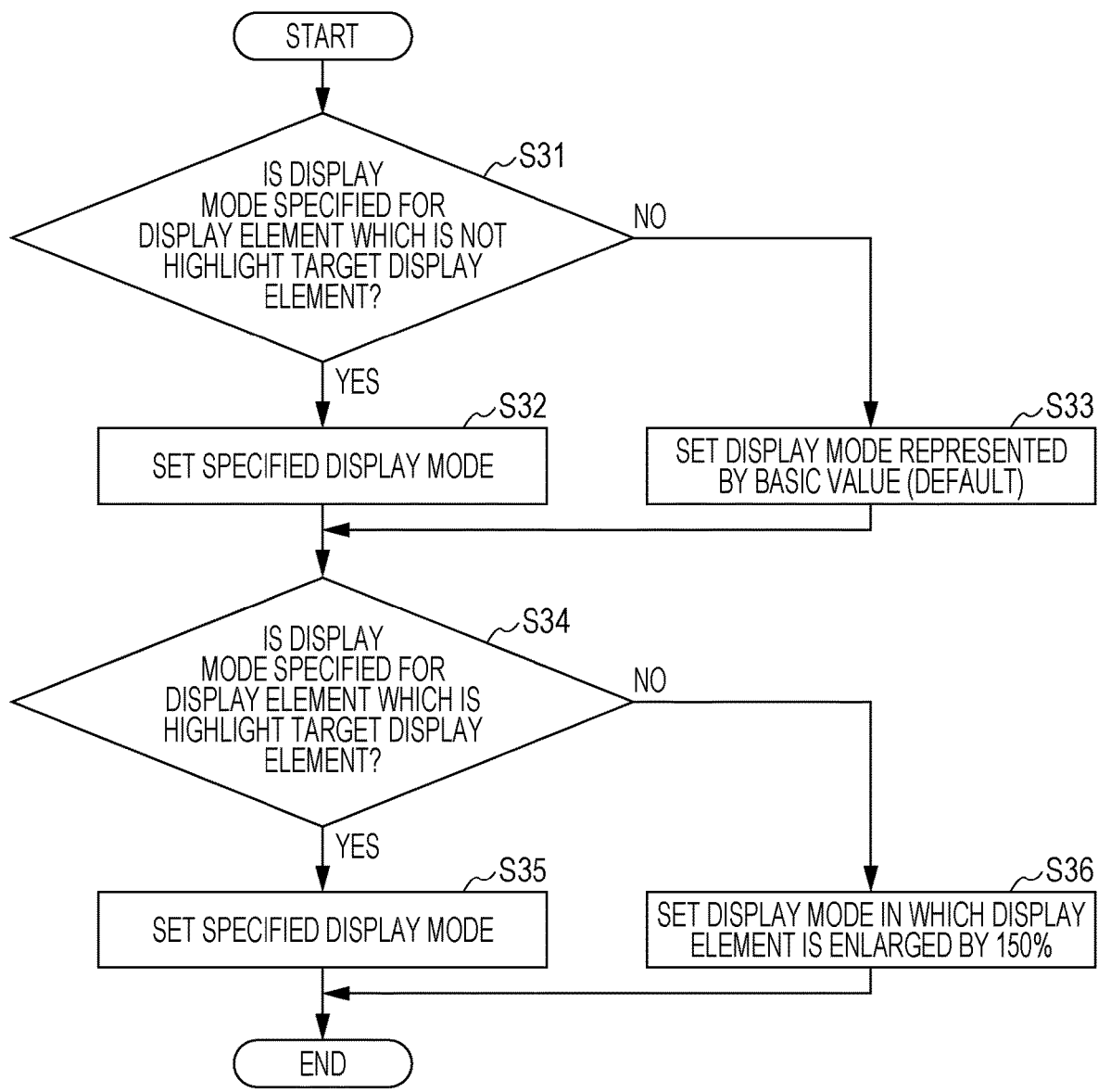
FIG. 6 is a flowchart illustrating an example of highlight processing according to the first embodiment.

A specific example of highlighting of a display element in step S16 will be discussed below with reference to FIG. 6. FIG. 6 is a flowchart illustrating an example of highlight processing for highlighting a display element.

In step S31, the display controller 120 determines whether there is a display mode specified in the HTML document for a display element which is not a highlight target display element. If the result of step S31 is YES, the display controller 120 sets the specified display mode for the display element in step S32. If the result of step S31 is NO, the display controller 120 sets a display mode represented by a predetermined basic value (default value) for the display element in step S33. In step S31, if there is a style sheet based on the definition of the HTML document, the display controller 120 refers to this style sheet and determines whether a display mode is specified. If the display mode is specified in the HTML document only for some items of a display element, the display controller 120 applies the default value to the other items of the display element.

In step S34, the display controller 120 determines whether there is a display mode specified in the HTML document for a display element which is specified as a highlight target display element in step S15. In the above-described important tag, a display mode for highlighting a display element is specified as the attribute, and this attribute is used for determining whether a display mode is specified in step S34. If the result of step S34 is YES, the display controller 120 sets the specified display mode for the display element in step S35. If the result of step S34 is NO, the display controller 120 sets a display mode represented by a predetermined highlight default value in step S36. An example of the highlight default value is a value for enlarging a display element by 150% of the basic value.

As a result of the display controller 120 executing this highlight processing, a highlight target display element to be focused by a user is displayed on the display surface (the screen of the display 104) in a display mode more noticeably than a display element which is not a highlight target in step S16.

Examples of a display operation performed by the display control apparatus 100 will be discussed below with reference to FIGS. 7 and 8.

FIG. 7 illustrates an example of data (HTML document) received from the server apparatus 200 by the display control apparatus 100.

In this HTML document, a creator has specified, by using an important tag, a display element which represents a character string indicating information "special condition: LMN . . . " as information to be focused by a user (important information). The view-style attribute of this important tag is defined as an example of a description that specifies a display mode for highlighting this display element. This view-style attribute defines that the display element which represents a character string indicating information "special condition: LMN . . . " is displayed in a font size larger than a normal font size (default size) by 200% and will also be underlined when it is highlighted.

In the HTML document, link information, such as "link to ABC system specifications" and "link to xxx-related item site", is indicated.

FIG. 8 illustrates the transition of the screen (display surface) on the display 104 in accordance with a change in the gaze point of a user. The screen shown in FIG. 8 is displayed by the display control apparatus 100 serving as a browsing function, on the basis of the HTML document shown in FIG. 7.

A screen 21a shows a state in which a gaze point 19a of eye gaze 20a of the user is located near the top right edge of the screen 21a. For the sake of description, it is assumed that, in step S14 of display control processing (FIG. 4), the display control apparatus 100 specifies, as a position range, a rectangular region of a certain size having a height corresponding to about two lines of character strings at and near the gaze point 19a displayed on the screen 21a. Within this position range at and near the gaze point 19a, there is no display element that satisfies a certain requirement as a highlight target candidate (see FIG. 7). Accordingly, a display element 22a which represents a character string indicating information "special condition: LMN . . . ", a display element 23a which represents link information "link to ABC system specifications", and a display element 24a which represents link information "link to xxx-related item site" are all displayed in a display mode corresponding to the basic value (default value) of the normal size. That is, no display elements (for example, character strings) on the screen 21a are highlighted.

A screen 21b shows a state in which eye gaze 20b of the user is slightly moved down (about one line) toward the bottom right from the state of the screen 21a and a gaze point 19b of the eye gaze 20b of the user has approached a display element 22b which represents a character string indicating information "special condition: LMN . . . ". The display element 22b is an element obtained by changing the display mode of the display element 22a on the screen 21a. Within the above-described position range, which is a rectangular region of a certain size at and near the gaze point 19b, the display element 22b which is specified by an important tag and which satisfies a certain requirement as a highlight target candidate is located. Accordingly, the display element 22b is determined to be a highlight target candidate (steps S22 and S23) and is displayed in a 200% larger size based on the view-style attribute (step S35).

A screen 21c shows a state in which eye gaze 20c of the user is considerably moved down from the state of the screen 21b and a gaze point 19c of the eye gaze 20c is moved to a portion between a display element 23a indicated by link information "link to ABC system specifications" and a display element 24b indicated by link information "link to xxx-related item site". The display element 24b is an element obtained by changing the display mode of the display element 24a on the screen 21a or 21b. Within the above-described position range, which is a rectangular region of a certain size at and near the gaze point 19c, the display elements 23a and 24b representing link information specified by A tags are located. For the sake of description, it is assumed that the number of visits to the webpage indicated by the link information represented by the display element 24b exceeds a predetermined threshold and that the number of visits to the webpage indicated by the link information represented by the display element 23a does not exceed the predetermined threshold. Accordingly, only the display element 24b is specified as a highlight target candidate (steps S24 and S23) and is displayed in a larger size than a normal size by 150% (step S36).

When the eye gaze of a user is moved, if a display element focused by the user is always highlighted based on the positional relationship between the eye gaze and the display element, the user may not recognize a specific item of information (important information) to be focused. In contrast, as described above, in the display control system 10, a display element which has a predetermined positional relationship with the eye gaze of a user and which represents information to be focused by the user is highlighted. This makes it easy for the user to recognize information to be focused and makes the user less likely to overlook the information.

Second Embodiment

A second embodiment will be described below. In the second embodiment, part of the highlight target candidate determining section 141 of the display control system 10 of the first embodiment is modified. Although the specific operation of the highlight target candidate determining section 141 in the second embodiment is different from that of the first embodiment, the configuration of a display control system 10 and the hardware configuration and the functional configuration of each of a display control apparatus and a server apparatus of the second embodiment are similar to those of the first embodiment. Accordingly, the display control apparatus and the server apparatus and elements forming the display control apparatus of the second embodiment are designated by like reference numerals. A description will mainly be given of points different from the first embodiment, and the points which will not be explained are similar to those of the first embodiment. For example, the display control apparatus 100 of the second embodiment also executes display control processing shown in FIG. 4.

In the second embodiment, the server apparatus 200 has a mail server function. The communication unit 150 of the display control apparatus 100 receives data concerning an email from the server apparatus 200 and storing it in the storage unit 110. If the email is described in HTML format, the content and the display mode of a display element (for example, characters) representing information indicated by the email is determined by the data described in HTML. If the email is described in text format, the content of a display element (for example, characters) representing information indicated by the email is determined by a character map.

Figures 9, 10:
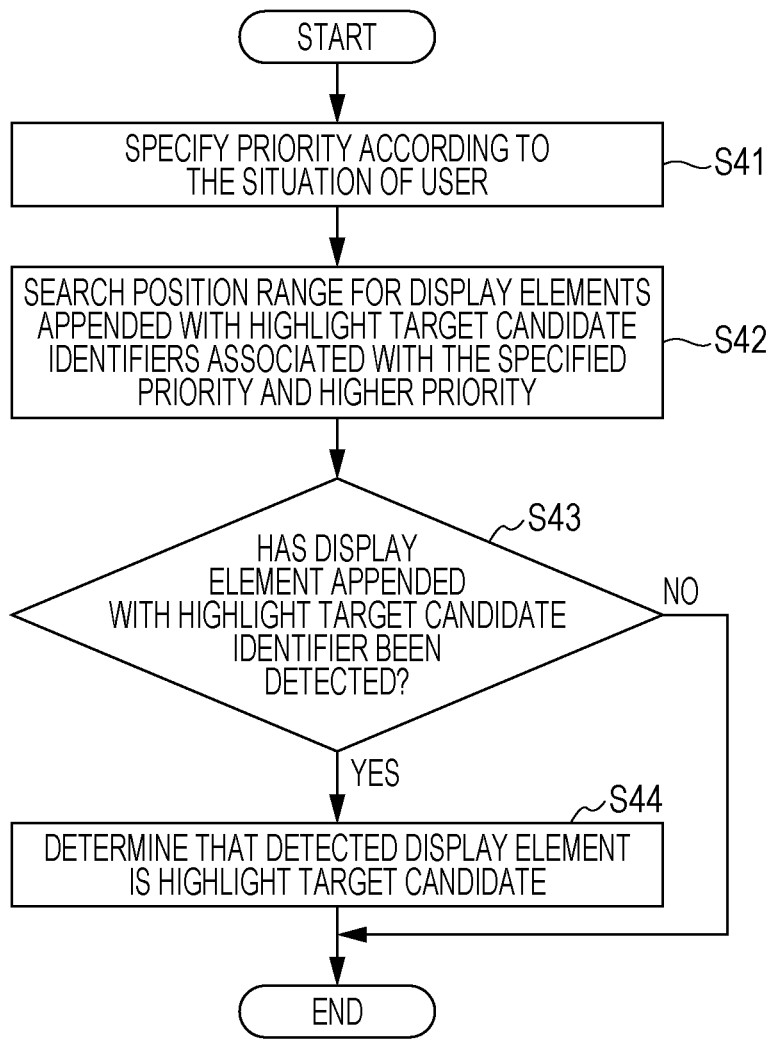
FIG. 9 illustrates example of highlight target candidate identifying information used in a display control apparatus according to a second embodiment.
FIG. 10 is a flowchart illustrating an example of highlight target candidate determining processing according to the second embodiment.

In the second embodiment, the highlight target candidate determining section 141 of the display control apparatus 100 determines whether a display element to be displayed based on data (email) is an element which satisfies a certain requirement as a highlight target candidate, on the basis of the situation of a user and highlight target candidate identifying information. An example of the highlight target candidate identifying information is shown in FIG. 9. The highlight target candidate identifying information is information in which an identifier for identifying a highlight target candidate display element is associated with the priority. In this case, as the priority number associated with a highlight target candidate identifier is smaller, the display element corresponding to this highlight target candidate identifier is focused in higher priority. In the example shown in FIG. 9, the display element in the highest priority (priority 1) is an element enclosed with bold brackets, and the display element in the second highest priority (priority 2) is an element enclosed with square brackets. The situation of a user refers to, for example, whether the user has to urgently check a certain item of information to be displayed (whether the user is in a hurry). In this case, the user may input information indicating whether the user is in a hurry, so that the display control apparatus 100 can recognize the situation of the user. Alternatively, the display control apparatus 100 may detect the situation of the user (whether the user is in a hurry) from the moving speed of the eye gaze of the user and the operation speed of the user (for example, the operation speed for scrolling the screen). Alternatively, if schedule information indicating the schedule of the user (for example, whether the user is out) is input into the display control apparatus 100, the display control apparatus 100 may refer to this schedule information to detect whether the user is in a hurry. For example, if there is only a predetermined period of time (for example, a few minutes) left before the user will be out, the display control apparatus 100 determines that the user is in a hurry. The degree of urgency (how much the user is in a hurry) may be classified as "high", "intermediate", and "low".

In the second embodiment, the display controller 120 may display a highlight target display element (for example, characters) in an email in a larger size than in a normal size for displaying a display element which is not a highlight target by 150% so that the highlight target display element can be more noticeable than the other display elements.

A specific example of the second embodiment in which the highlight target candidate determining section 141 determines a highlight target candidate (see step S15 of FIG. 4) will be discussed below with reference to FIG. 10. FIG. 10 is a flowchart illustrating an example of highlight target candidate determining processing in the second embodiment.

After the position range is decided by the position range decision section 142 in step S14 of FIG. 4, in step S41, the highlight target candidate determining section 141 specifies the priority according to the situation of a user. More specifically, the highlight target candidate determining section 141 specifies the priority according to whether the user is in a hurry or according to the degree of urgency. In this case, if the user is in a hurry, the highlight target candidate determining section 141 specifies the value indicating the priority 1 (highest priority), and if the user is not in a hurry, the highlight target candidate determining section 141 specifies the value indicating the priority 2 (second highest priority).

Then, in step S42, the highlight target candidate determining section 141 searches the position range decided in step S14 for display elements appended with the highlight target candidate identifier associated with the priority specified in step S41 or the highlight target candidate identifier associated with a higher priority. For example, if the user is in a hurry, the priority specified in step S41 and a higher priority than that is only the priority 1, and the highlight target candidate determining section 141 searches for display elements enclosed with bold brackets, which represent the highlight target candidate identifier associated with the priority 1. If the user is not in a hurry, the priority specified in step S41 and a higher priority than that are the priority 1 and the priority 2, and the highlight target candidate determining section 141 searches for display elements enclosed with bold brackets, which represent the highlight target candidate identifier associated with the priority 1, and those enclosed with square brackets, which represent the highlight target candidate identifier associated with the priority 2.

Then, in step S43, the highlight target candidate determining section 141 determines whether a display element appended with a corresponding highlight target candidate identifier has been detected. If the result of step S43 is YES, the highlight target candidate determining section 141 proceeds to step S44 to determine that the detected display element is a highlight target candidate. That is, if no display element has been detected as a result of a search in step S42, it means that none of the display elements within the position range decided in step S14 are a highlight target candidate.

Information to be focused by a user is changed according to the situation of the user. Accordingly, the display control apparatus 100 that executes the above-described highlight target candidate determining processing shown in FIG. 10 changes a display element to be highlighted in accordance with the eye gaze of the user and the situation of the user.

An example of a display operation performed by the display control apparatus 100 of the second embodiment will be discussed below with reference to FIG. 11.

Figure 11:
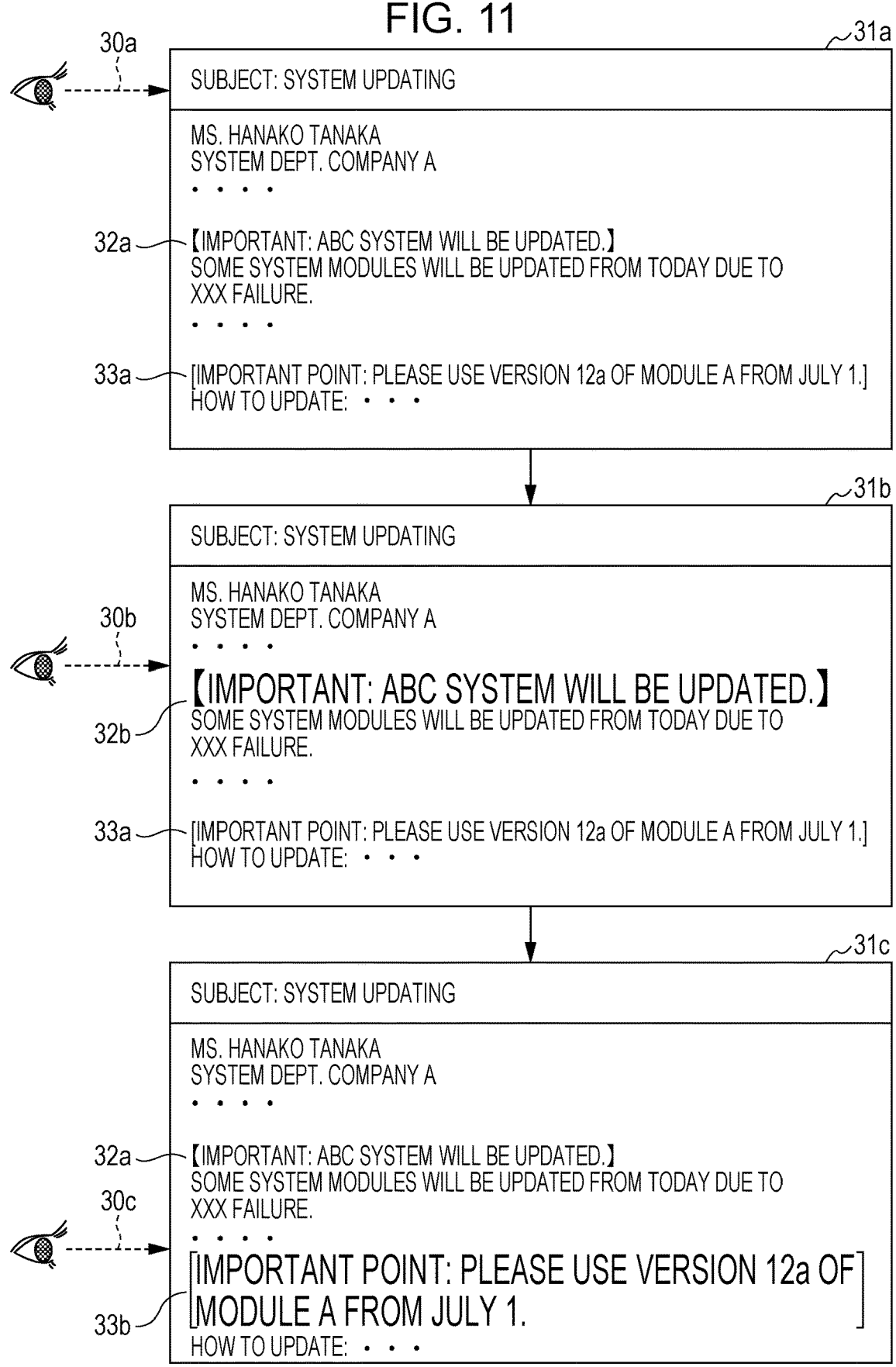
FIG. 11 illustrates an example of the transition of a screen (display surface) displayed by the display control apparatus according to the second embodiment.

FIG. 11 illustrates the transition of the screen (display surface) on the display 104 displayed by the display control apparatus 100 based on an email in accordance with a change in the gaze point of a user. In the example shown in FIG. 11, an email sender has appended highlight target candidate identifiers (such as bold brackets and square brackets) to portions of the email where the email sender would like an email receiver (user) to focus.

A screen 31a shows a state in which the gaze point of eye gaze 30a of the user is located near the topmost line of the screen 31a. For the sake of description, it is assumed that the gaze point of the eye gaze 30a is indicated by a position in the top-bottom direction (vertical direction) of the screen 31a and that, in step S14 of display control processing (FIG. 4), the display control apparatus 100 specifies, as a position range, a rectangular region of a certain size having a height corresponding to about two lines of character strings at and near the gaze point displayed on the screen 31a. It is also assumed that the user is not in a hurry as the situation of the user. On the screen 31a, within the position range of about two lines at and near the gaze point of the user, there is no display element enclosed with bold brackets or square brackets. Accordingly, all display elements (character strings) representing the content of the email including display elements 32a and 33a are displayed in a normal size and are not highlighted.

A screen 31b shows a state in which eye gaze 30b of the user is slightly moved down (about one line) from the state of the screen 31a and the gaze point of the eye gaze 30b of the user is located at a position slightly above a display element 32b indicating "Important: ABC system will be updated" enclosed with bold brackets. The display element 32b is an element obtained by changing the display mode of the display element 32a on the screen 31a. The display element 32b is highlighted by the display controller 120 as a result of the highlight target candidate determining section 141 executing highlight target candidate determining processing (FIG. 10). More specifically, since the user is not in a hurry, the highlight target candidate determining section 141 searches the position range including the gaze point of the user for character strings enclosed with bold brackets representing the highlight target candidate identifier associated with the priority 1 and those enclosed with square brackets representing the highlight target candidate identifier associated with the priority 2, and as a result of a search, the display element 32b is detected (steps S41 through S43), and the detected display element 32b is determined to be a highlight target candidate (step S44). Changing of the display mode to highlight a display element will be explained, assuming that the email is described in HTML format. In order to change the display mode, the HTML file used for displaying the email may be altered by inserting a tag for changing the display mode into this HTML file. For example, the display control system 10 retains a table indicating that a character string enclosed with bold brackets or square brackets is displayed in a larger size. Then, a tag for highlighting such a character string based on the information indicated in the table when the eye gaze of a user is directed near this character string may be inserted into the HTML file.

A screen 31c shows a state in which eye gaze 30c of the user is further moved down (about one line) from the state of the screen 31b and the gaze point of the eye gaze 30c of the user is located at a position slightly above a display element 33b indicating "Important point: please use version 12a of module A from July 1" enclosed with square brackets. The display element 33b is an element obtained by changing the display mode of the display element 33a on the screen 31a or 31b. In this case, too, in order to change the display mode, the HTML file for displaying the email may be altered by inserting a tag for changing the display mode into this HTML file. On the screen 31c, the display element 32a, which is not a highlight target element, is changed from the display element 32b, which is a highlight target element on the screen 31b, and is displayed in the normal size. If the user is in a hurry as the situation of the user, display elements appended with the highlight target candidate identifier (square brackets) associated with the priority 2 are not searched for (steps S41 and S42). Accordingly, the display element 33a in the normal size is displayed on the screen 31c, instead of the display element 33b.

As described above, in the display control system 10 of the second embodiment, the display control apparatus 100 switches between a display mode in which a display element appended with a highlight target candidate identifier is highlighted and a display mode in which a display element appended with a highlight target candidate identifier is not highlighted, depending on the positional relationship between the eye gaze and the display element and the situation of the user.

Third Embodiment

A third embodiment will be described below. In the third embodiment, part of the display control apparatus 100 of the display control system 10 of the first embodiment is modified.

(Configuration)

FIG. 12 is a functional block diagram of a display control apparatus 100a according to the third embodiment. The display control apparatus 100a is formed by modifying part of the display control apparatus 100 of the first embodiment.

As shown in FIG. 12, the display control apparatus 100a includes, as functional elements, a storage unit 110a, a display controller 120, an eye gaze information acquiring unit 130, a highlight target specifying unit 140a, a communication unit 150, and an attribute information acquiring unit 160. The highlight target specifying unit 140a includes a highlight target candidate determining section 141a, which is formed by modifying the highlight target candidate determining section 141, and a position range decision section 142a, which is formed by modifying the position range decision section 142. Among the elements of the display control apparatus 100a, the same elements as those of the display control apparatus 100 of the first embodiment are designated by like reference numerals, and an explanation thereof will thus be omitted. The hardware configuration of the display control apparatus 100a is the same as that of the display control apparatus 100, and the display control apparatus 100a includes an eye gaze detection mechanism. A description will mainly be given of points different from the first embodiment, and the points which will not be explained are similar to those of the first embodiment.

The storage unit 110a is realized by part of the memory 102, and has a function similar to that of the storage unit 110 of the first embodiment. The storage unit 110a also has a function of storing attribute information concerning the attributes of a user and a range decision table used for deciding the size of a position range based on the gaze point of a user.

FIG. 13 illustrates an example of the attribute information. As shown in FIG. 13, the attribute information concerning a user indicates information concerning the gender, age group, age, visual acuity, hobbies, and address. The attribute information is input into the input device 106 by a user and is stored in the storage unit 110a.

FIG. 14 illustrates an example of the range decision table. In the example of the range decision table shown in FIG. 14, each of the combination patterns of the visual acuity, age group, and gender of a user are associated with the size of the position range. This range decision table is referred to by the position range decision section 142a. The range decision table may be designed based on experiments so that the size of the position range can be proportional to the range of the field of view of a user to some extent. For example, the size of the position range may be specified by using attributes such as the visual acuity, age group, age, and gender of a user. In the example of the range decision table shown in FIG. 14, the size of the position range is represented by five levels such as "largest", "large", "medium", "small", and "smallest". However, the sizes of the position range may be represented by specific values.

The highlight target specifying unit 140a has a function of specifying, among display elements displayed by the display controller 120 based on data, a display element within a predetermined position range that has a predetermined positional relationship with the eye gaze of a user and that satisfies a certain requirement as a highlight target candidate, by referring to the eye gaze information acquired by the eye gaze information acquiring unit 130. The predetermined position range has a size determined based on the user attributes and the situation of the user. That is, the highlight target specifying unit 140a has a function of specifying a highlight target display element which represents information to be focused by a user. The highlight target specifying unit 140a is realized by the processor 101 executing the control program and the communication I/F 103.

The highlight target candidate determining section 141a serves the function of determining a display element that satisfies a certain requirement as a highlight target candidate. More specifically, the highlight target candidate determining section 141a determines whether a display element based on data is an element that satisfies a certain requirement as a highlight target candidate, by analyzing the content of the data based on information concerning the content of the data in accordance with the attributes of a user. For example, by utilizing a dictionary in which keywords which may be important for people being classified under the same group regarding a certain attribute are registered, the highlight target candidate determining section 141a determines whether a display element based on data such as a document includes a keyword registered in this dictionary. If the display element includes such a keyword, the highlight target candidate determining section 141a determines that this display element is a highlight target candidate that satisfies a certain requirement. For example, if a hobby of a user indicated by the attribute information shown in FIG. 13 is football, the highlight target candidate determining section 141a analyzes the data by utilizing a dictionary in which keywords (such as football, goalkeeper, and offside) which may be important for people being interested in football are registered, and determines whether a display element based on this data is a highlight target candidate. If the address of a user indicated by the attribute information shown in FIG. 13 is a certain town, the highlight target candidate determining section 141a determines that a display element which represents information concerning this town, for example, information concerning a description of the town (a store guide, event venue, etc. of this town) satisfies a certain requirement as a highlight target candidate.

The position range decision section 142a serves the function of deciding the size of a position range and specifying a display element within the position range that has a predetermined positional relationship with the eye gaze (gaze point) of a user, on the basis of a detection result of the position of the gaze point of the user. More specifically, by utilizing the range decision table stored in the storage unit 110a, the position range decision section 142a decides the size of a position range, which is used for highlighting a display element within this position range that has a predetermined positional relationship with the eye gaze of the user among display elements that are displayed on the display surface by the display control apparatus 100a and that satisfy a certain requirement as a highlight target candidate.
(Operation)

An example of the operation performed by the display control apparatus 100a configured as described above will be discussed below.

FIG. 15 is a flowchart illustrating an example of display control processing executed by the display control apparatus 100a. The operation of the display control apparatus 100a will be described below with reference to FIG. 15.

In step S51, the display control apparatus 100a stores attribute information in the storage unit 110a on the basis of the attributes of a user input from the input device 106. The attribute information may be provided to the display control apparatus 100a in any manner at least once, and does not have to be input every time display elements are displayed based on data.

In step S52, the display control apparatus 100a receives data from the server apparatus 200 by using the communication unit 150 in accordance with a user operation received by the input device 106, and stores the received data in the storage unit 110a. Examples of the data are HTML documents representing webpages, emails, and documents for an application program such as a word-processing program.

In step S53, the display controller 120 displays, based on the data indicating information stored in the storage unit 110a, display elements representing this information on the screen of the display 104. In this case, the display controller 120 specifies, for example, a predetermined normal size, as the display mode for the display elements. As a result of displaying the display elements in step S53, the user is able to view the information constituted by a set of multiple display elements displayed on the screen of the display 104.

In step S54, the eye gaze information acquiring unit 130 acquires eye gaze information from the eye gaze detection mechanism disposed within the display control apparatus 100a, and detects a gaze point of the user on the display surface.

Then, in step S55, the position range decision section 142a decides the size of a position range based on the attribute information and the situation of the user, and then decides the position of the position range for restricting highlight target display elements in accordance with the position of the detected gaze point of the user. The position range decision section 142a specifies the size of the position range by using the range decision table (see FIG. 14), on the basis of the attribute information (see FIG. 13) stored in the storage unit 110a in step S51. Then, the position range decision section 142a alters the size of the position range according to the situation of the user, such as whether the user is in a hurry, which has been discussed in the second embodiment. For example, if the user is in a hurry, the position range decision section 142a alters the position range to be a smaller size than that if the user is not in a hurry. The situation of the user may be the degree of fatigue of the user calculated from the duration of time for which the user has been continuously looking at the screen or the moving speed of the eye gaze. If the fatigue of the user is high, the position range decision section 142a may alter the position range to a smaller size.

Then, in step S56, the highlight target specifying unit 140a determines, among the display elements located within the position range, a display element that satisfies a certain requirement as a highlight target candidate based on the user attribute information so as to specify a highlight target candidate within the position range as a highlight target.

Then, in step S57, the display controller 120 determines a display mode based on the data so as to highlight the display element specified by the highlight target specifying unit 140a, and then displays this display element in accordance with the determined display mode. Changing of the display mode for highlighting a display element may be implemented as follows. If a webpage based on an HTML document (file) is displayed, the source HTML file may be altered by inserting a tag for changing the display mode into this HTML file. For example, the display control system 10 retains a table in which a predetermined highlight display mode (for example, a predetermined font size) is associated with a display element specified based on the user attributes or the user situation. Then, a tag for highlighting such a display element based on the information indicated in the table when the eye gaze of a user is directed near this display element may be inserted into the HTML file. With this operation, the display element specified by the highlight target specifying unit 140a is displayed (highlighted) in a first display mode, while display elements that are not specified by the highlight target specifying unit 140a are displayed in a second display mode. The specified display element is displayed more noticeably in the first display mode, while the unspecified display elements are displayed less noticeably in the second display mode. In the first display mode, the display element may be displayed in a larger size than the size of the second display mode. Steps S54 through S57 are repeated, so that a highlight target display element is changed in accordance with the movement of the gaze point of the user, thereby switching a display element to be highlighted. The display controller 120 may initially display all the display elements on the screen of the display 104 in the second display mode in step S53, and then may change the display mode of only a highlight target display element to the first display mode and may display this display element in the first display mode in step S57. In this case, when a display element highlighted in the first display mode is determined to be a display element which is not a highlight target, the display mode of such a display element may be changed to the second display mode.

Other Embodiments

The present disclosure has been described through illustration of the first through third embodiments. However, the above-described embodiments are only examples, and various modifications, additions, and omissions may be made to the embodiments.

(1) The above-described display control apparatus 100 or 100a integrates the eye gaze detection mechanism therein. However, the eye gaze detection mechanism may be disposed outside of the display control apparatus 100 or 100a, as long as the display control apparatus 100 or 100a can acquire eye gaze information concerning the eye gaze of a user. Any technique such as infrared imaging of the user eye may be utilized to detect the eye gaze of the user or a gaze point on the display surface by using the eye gaze detection mechanism. Instead of acquiring eye gaze information from the eye gaze detection mechanism, the display control apparatus 100 or 100a may obtain eye gaze information in the following manner. The display control apparatus 100 or 100a may consider a position specified by a pointing device, which serves as the input device 106, (such as a position specified by a cursor or a mouse pointer) as a gaze point of a user, and may acquire information concerning this position as eye gaze information concerning the eye gaze of the user.

(2) In the above-described embodiments, display elements are displayed on the display surface, which is the screen of a display, for example. However, display elements may be displayed on the display surface of a projection screen projected on a wall, for example, by using a projector. This display surface may be either of a flat plane or a curved plane. Display elements may be displayed on the display surface two-dimensionally. Alternatively, display elements may be projected in a space so as to be displayed stereoscopically (three-dimensionally). In this case, a display element that may be specified as a highlight target display element by the display control apparatus 100 or 100a is a display element that has a predetermined positional relationship with the eye gaze of a user, for example, a display element included in a region formed in a cylindrical shape having a certain radius from the eye gaze (straight line) of the user in a space.

(3) The display control apparatus 100 or 100a may not necessarily include the display 104. Instead, the display controller 120 may output a video signal for displaying an image indicating one or more display elements to an external display device and may control the displaying of such display elements on this display device. The display control system 10 may include at least one of a display device, a display control apparatus that performs display control of display elements on the display device, a server apparatus that performs display control of display elements on the display device, and a server apparatus that serves as some functions of the display control apparatus.

(4) In the third embodiment, the position range is decided by the position range decision section 142a by using the range decision table (FIG. 14). Alternatively, data (such as a document) representing information, which is a base for displaying display elements, may include information concerning a range specifying element for specifying the size of a position range. The size of a position range may be decided according to the paragraph, line, or pixel, for example, three lines or one hundred pixels. The position range decision section 142a may decide the position range based on this range specifying element, instead of using the range decision table. For example, the size of a position range, for example, a 100-pixel square, may be specified by using a tag, such as <view size> in the HTML document shown in FIG. 7. Alternatively, the position range may be decided based on layout information indicating the positional arrangement and size of one or more display elements which represent information indicated by data. The layout information may indicate the positional arrangement of a display element by position coordinates on the screen, the number of characters per line, or line spacing. This layout information may be provided by part of data, such as a document, for displaying display elements, or may be provided separately from data. Based on this layout information, the position range decision section 142a may determine the size of a position range, for example, to be larger, as there are more spaces in character strings in the data such as an email and a document.

(5) Data indicating information, such as the above-described HTML documents, document files for a specific application program, such as a word-processing program, emails, map data, and electronic books, may include video information (information for specifying a playback region for playing back video). In this case, concerning a video display object as a display element including such a playback region for playing back video, the display controller 120 may highlight this video display object by playing back the video in the playback region. As a specific example, when a video display object to be displayed based on a description, such as <video src="video.mp4" poster="1 frame.jpg"></video> included in an HTML document is highlighted, the display control apparatus 100 or 100a may play back video.mp4. When the video display object is not highlighted, the display control apparatus 100 or 100a may display a still image based on 1 frame.jpg. Concerning a video display object including a playback region for displaying advertisement video, the display controller 120 may perform display control so that this advertisement is displayed as a still image in the playback region when the video display object is not highlighted and so that the advertisement video (for example, video images changing over time) will be played back in the playback region when the video display object is highlighted. Alternatively, the data may indicate region information concerning a display region for displaying information. In this case, the display control apparatus 100 or 100a may perform display control so that a display region object including a display region and serving as a display element indicating the region information will be displayed based on the data, and the display controller 120 may highlight this display region object by the insertion of information corresponding to user attribute information into the display region of the display region object. The display region object is, for example, a type of display element including a display region for displaying information, such as a web banner. If the user attribute information is concerned with the attribute regarding hobbies, information related to the hobbies of the user is inserted into the display region of the display region object. Accordingly, information to be inserted differs according to the user. The information to be inserted may be selected from items of information stored in the display control system 10 in association with each item of attribute information.

(6) The assignment of the functions to the functional elements of the display control apparatus 100 or 100a in the above-described embodiments is only an example. The functions may be assigned to the functional elements in a desired manner. For example, the highlight target specifying unit 140 may be included in the display controller 120 as a function of specifying a highlight target display element, as part of the display control function performed by the display controller 120.

(7) In the above-described display control processing (see FIG. 4), a determination as to whether a display element satisfies a condition for a predetermined positional relationship with the eye gaze of a user is made by deciding a position range of a certain size from the gaze point of the user (step S14) and by determining whether the display element is contained within this position range (step S15). Alternatively, the above-described determination may be made by setting a region of a certain range from each display element and by determining whether the gaze point is contained within this region.

(8) In the first embodiment, an important tag is described in an HTML document, which is data indicating information to be displayed. However, the data may be an eXtensible Markup Language (XML) document, and the display control apparatus 100 may specify the display mode of the display elements in the XML document by using a style sheet associated with the XML document. Additionally, in the first embodiment, link information is included in an HTML document. However, instead of the HTML document, link information may be included in a document for an application program, such as a word-processing program, as information for accessing to another document (external document). In this case, the display control apparatus 100 may manage the number of times the external document has been utilized (viewed) by using an application program, such as a word-processing program, and the highlight target candidate determining section 141 may determine whether the display element representing this link information satisfies a certain requirement, based on this number of times.

(9) The position range decision section 142 decides a position range with respect to the gaze point of a user and specifies a display element within this position range. However, instead of using a position range, the position range decision section 142 may specify a display element positioned on a line extending from the eye gaze of a user. Alternatively, the position range decision section 142 may decide a position range which does not include the gaze point of a user, based on the position of the gaze point. Additionally, the shape of the position range is not restricted to a rectangle or a circle, and may be any shape, such as a polygon.

(10) The above-described user attribute information may be information obtained by making a certain measurement concerning a user (for example, a current position of a user). In the third embodiment, the position range decision section 142a decides the size of a position range by using both of the attribute information concerning a user and the situation of the user, such as whether the user is in a hurry. However, the position range decision section 142a may utilize only one of the attribute information and the situation of a user. In the third embodiment, the highlight target candidate determining section 141a analyzes data based on the attribute information concerning a user, and determines whether each display element satisfies a certain requirement as a highlight target candidate. Alternatively, the highlight target candidate determining section 141a may make this determination based on information concerning the content of data (for example, information indicating the category or topic of data), instead of using the attribute information. If data is an HTML document, the category of the data may be specified based on a tag indicating, for example, a title or a heading. For example, if the category of the data is a book review, by using a dictionary in which items of information are associated with each category, a book title and an author name may be selected as items of information to be focused, and a display element representing a book title or an author name may be determined to be a display element that satisfies a certain requirement as a highlight target candidate. If the category of the data is a computer program, a display element representing a location of the occurrence of an error may be an element that satisfies a certain requirement as a highlight target candidate. Alternatively, the highlight target candidate determining section 141 or 141a may determine whether a display element satisfies a certain requirement as a highlight target candidate, based on documents viewed by a user in the past. In this case, the display control apparatus 100 or 100a may store records (log information) concerning documents viewed by the user in the past (for example, HTML documents accessed by the user) in the storage unit. Then, by referring to the content of the documents viewed by the user in the past, for example, a display element representing a predetermined number of words included in such documents may be determined to be a display element that satisfies a certain requirement as a highlight target candidate. Alternatively, by using a dictionary in which keywords are registered, some keywords may be extracted from the documents viewed by a user in the past, and a display element representing these keywords may be determined to be a display element that satisfies a certain requirement as a highlight target candidate.

(11) In the above-described embodiments, the display controller 120 performs control so that a highlight target display element will be displayed in a first display mode and a display element which is not a highlight target will be displayed in a second display mode. For example, in the first display mode, the highlight target display element is displayed, for example, in a larger size than the size in the second display mode, or the highlight target display element is underlined. However, a highlight target display element may be displayed in any manner in the first display mode as long as it is displayed more noticeably than that in the second display mode. For example, in order to highlight a highlight target display element, the display controller 120 may display this display element in color in the first display mode and may display one or more display elements other than the highlight target display element monochromatically in the second display mode. Displaying of a display element in color refers to that the display element is displayed by using colors other than black, white, and gray as well as these three colors. Displaying of a display element monochromatically refers to that the display element is displayed only in black, white, and gray. Gray is not restricted to a specific, single color, but may include multiple tones of gray with different shades. Specifically, display elements may be displayed in color or monochromatically in the following manner. If display elements are images, the color of display elements may be changed (into a monochromatic color, for example) by performing image processing (so-called color correction). If display elements are characters, the HTML document may be altered so that the color of characters will be changed. Alternatively, the display controller 120 may highlight a display element by displaying this display element in the first display mode with a certain level of resolution and by displaying one or more display elements other than this display element in the second display mode with a lower level of resolution than the resolution of the first display mode. The resolution of a display element may be decreased, for example, by preforming image processing on the image (a set of pixels) of this display element so that the values of the pixels within a certain range of the image are replaced by the average value of the pixels of this range of the image. As an example, if the display element is an image, the resolution may be decreased by performing image processing, such as smoothing, on this image. If the display element is a set of characters, the resolution may be decreased by altering the HTML document so that the font of the characters will be changed from a normal font to a predetermined font with a lower level of resolution. Alternatively, the display controller 120 may highlight a display element by displaying this display element with a certain level of the edge in the first display mode and by displaying one or more display elements other than this display element in the second display mode in which the edge is less sharp than that in the first display mode. The edge of a display element refers to, for example, a portion at which a change in the density (brightness) gradient of the pixels of the display element is relatively sharp (an example of such a portion is a contour). The edge of a display element may be made less sharp in the second display mode by performing image processing on this display element so that the degree of sharpness of the edge (for example, the density gradient) will become smaller than that in the first display mode. More specifically, if the display element is an image, the edge enhancement may be modified by performing image processing on this image, and if the display element is a set of characters, the edge enhancement may be modified by altering the HTML document so that the font of the characters will be changed from a normal font to a predetermined font with a decreased level of edge enhancement.

(12) The display control apparatus 100 may not include the communication unit 150 and the storage unit 110, and may have a function (acquiring unit) of acquiring data from an external device or storage medium.

(13) All or some of the components forming each of the display control apparatus 100 or 100a and the server apparatus 200 in the above-described embodiments may be constituted by a single system LSI (Large Scale Integration), which is typically an LSI circuit. The system LSI is an ultra-multi-functional LSI in which plural components are integrated into one chip, and is specifically a computer system including a microprocessor, a ROM, a RAM, etc. In the RAM, a computer program is recorded. As a result of the microprocessor operating in accordance with the computer program, the system LSI implements its functions. The components forming each of the display control apparatus 100 or 100a and the server apparatus 200 may be individually formed into single chips, or some or all of the components may be formed into one chip. As described above, the integrated circuit is called a system LSI, but it may also be called an IC, an LSI, a super LSI, and an ultra LSI, depending on the integration degree. The integration technology of the components is not restricted to the LSI technology. Instead, a dedicated circuit or a general-purpose processor may be used. Moreover, a FPGA (Field Programmable Gate Array) or a reconfigurable processor that may reconfigure connections or settings of circuit cells within an LSI may be used. Further, due to the progress of semiconductor technologies or the appearance of a derivative technology, if a circuit integration technology which replaces a current semiconductor technology is developed, the functional blocks may be integrated by utilizing such a technology. The application of biotechnology may be a possibility of integrating the functions.

(14) All or some of the components forming each of the display control apparatus 100 or 100a and the server apparatus 200 in the above-described embodiments may be constituted by an IC card or a single module that is attachable to and removable from the display control apparatus 100 or 100a or the server apparatus 200. The IC card or module is a computer system including a microprocessor, a ROM, a RAM, etc. The IC card or module may include the above-described ultra-multi-functional LSI. As a result of the microprocessor operating in accordance with the computer program, the IC card or module implements its functions. The IC card or module may have tamper-resistant characteristics.

(15) In one aspect of the present disclosure, the above-described display control method may be provided, or a computer program implementing this display control method by using a computer, or a digital signal constituted by this computer program may be provided. In one aspect of the present disclosure, a computer-readable recording medium storing the computer program or the digital signal therein may be provided. Examples of the computer-readable recording medium are a flexible disk, a hard disk, a CD-ROM, a magneto-optical (MO) disk, a digital versatile disc (DVD), a DVD-ROM, a DVD-RAM, a Blu-ray (registered trademark) disc (BD), and a semiconductor memory. In one aspect of the present disclosure, a transmission medium for transmitting the above-described computer program or digital signal via a network, such as a telecommunications line, a wired or wireless communication line, or the Internet, or via data broadcasting may be provided. In one aspect of the present disclosure, a computer system including a microprocessor and a memory may be provided. The memory may store the above-described computer program therein, and the microprocessor may operate in accordance with the computer program. The above-described computer program or digital signal may be transferred to another computer system via a network or by recording the computer program or digital signal in the above-described recording medium. Then, this computer system may execute the received computer program or digital signal.

(16) The components and functions in the above-described embodiments and modified examples may be combined in a desired manner, and a mode realized by such a combination of the components and functions is also encompassed within the scope of the present disclosure.

The present disclosure may be applicable to the use for performing display based on documents, emails, etc.

What is claimed is:

1. A display control method, comprising:
acquiring, by a camera, eye gaze information concerning eye gaze of a user;
specifying, as a highlight target display element by a processor, among at least one display element to be displayed based on data indicating at least one item of information, a display element that has a predetermined positional relationship with the eye gaze of the user indicated by the eye gaze information and that satisfies a certain requirement as a highlight target candidate; and
performing, by the processor, display control so that the specified highlight target display element is highlighted,
wherein the predetermined positional relationship includes a position range determined based on the eye gaze, the position range including an area having a boundary that has the predetermined positional relationship away from a position on a display surface receiving the eye gaze,
wherein the certain requirement being that the highlight target candidate is of a particular importance within the position range, such that a display element having the particular importance within the position range is selected to be highlighted over a display element more closely corresponding to a direction of the eye gaze to direct the user's gaze towards the display element having the particular importance, and
wherein the particular importance is based on metadata corresponding to the highlight target candidate.

2. The display control method according to claim 1, further comprising
performing, by the processor, control so that the at least one display element is displayed on the display surface, wherein
in the acquiring of the eye gaze information, a gaze point position indicating the position on the display surface at which the user is gazing is detected as the eye gaze information,
in the specifying of the highlight target display element, it is determined whether the at least one display element has the predetermined positional relationship, based on a display position of the at least one display element on the display surface and the detected gaze point position, and
in the performing of display control, the specified highlight target display element is displayed in a first display mode on the display surface so as to be highlighted and the at least one display element other than the specified highlight target display element is displayed in a second display mode on the display surface, the second display mode being different from the first display mode.

3. The display control method according to claim 1, wherein, in the specifying of the highlight target display element, it is determined that, among the at least one display element, a display element located within the position range is a display element that has the predetermined positional relationship.

4. The display control method according to claim 1, wherein:
the data includes information concerning a range specifying element for specifying a size of the position range; and
the position range is based on the range specifying element.

5. The display control method according to claim 1, wherein the position range is based on layout information indicating an arrangement of the at least one display element to be displayed on the display surface.

6. The display control method according to claim 1, wherein a size of the position range is based on attribute information concerning an attribute of the user.

7. The display control method according to claim 1, wherein the position range is based on a physiological or scheduling situation of the user.

8. The display control method according to claim 1, wherein:
the data includes information concerning an important information specifying element for specifying important information, which is an item of information to be focused among the at least one item of information indicated by the data; and
in the specifying of the highlight target display element, it is determined whether the at least one display element satisfies the certain requirement, based on whether the at least one display element represents important information specified by the important information specifying element.

9. The display control method according to claim 1, wherein, in the specifying of the highlight target display element, it is determined whether the at least one display element satisfies the certain requirement based on the metadata, the metadata concerning content of the data.

10. The display control method according to claim 1, wherein:
the data is a document including link information for relating the document to an external document; and
in the specifying of the highlight target display element, it is determined whether, among the at least one display element, a display element representing the link information satisfies the certain requirement based on the metadata, the metadata indicating a number of visits to the external document which is related to the document by the link information.

11. The display control method according to claim 1, wherein, in the specifying of the highlight target display element, it is determined whether the at least one display element satisfies the certain requirement based on the metadata, the metadata including attribute information concerning an attribute of the user.

12. The display control method according to claim 1, wherein, in the specifying of the highlight target display element, it is determined whether the at least one display element satisfies the certain requirement based on the metadata, the metadata indicating a document viewed by the user in the past.

13. The display control method according to claim 1, wherein, in the specifying of the highlight target display element, it is determined whether the at least one display element satisfies the certain requirement based on the metadata, the metadata indicating a physiological or scheduling situation of the user.

14. The display control method according to claim 1, wherein, in the performing of display control, the specified highlight target display element is highlighted by displaying the specified highlight target display element in color and by displaying the at least one display element other than the specified highlight target display element monochromatically.

15. The display control method according to claim 1, wherein, in the performing of display control, the specified highlight target display element is highlighted by decreasing a level of resolution of the at least one display element other than the specified highlight target display element to a lower level than a level of resolution of the specified highlight target display element.

16. The display control method according to claim 1, wherein, in the performing of display control, the specified highlight target display element is highlighted by making an edge of the at least one display element other than the specified highlight target display element less sharp.

17. The display control method according to claim 1, wherein:
the data includes video information indicating video;
the display control method further comprising performing control so that a video display object which includes a playback region for playing back the video indicated by the video information and which serves as a display element representing the video information is displayed based on the data; and
in the display control method, if the specified highlight target display element is the video display object, the specified highlight target display element is highlighted by playing back the video in the playback region of the video display object.

18. The display control method according to claim 1, wherein:
the data indicates region information concerning a display region for displaying information;
the display control method further comprising performing control so that a display region object including the display region and serving as a display element representing the region information is displayed based on the data; and
in the display control method, if the specified highlight target display element is the display region object, the specified highlight target display element is highlighted by insertion of information corresponding to attribute information concerning an attribute of the user into the display region of the display region object.

19. The display control method according to claim 1, wherein the position range is a variable range that is modified according to attribute information of the user.

20. A display control apparatus comprising:
one or more memories; and
circuitry which, in operation,
acquires data indicating at least one item of information,
acquires eye gaze information concerning eye gaze of a user,
specifies, as a highlight target display element, among at least one display element to be displayed based on the data, a display element that has a predetermined positional relationship with the eye gaze of the user indicated by the eye gaze information and that satisfies a certain requirement as a highlight target candidate, and
performs display control so that the specified highlight target display element is highlighted,
wherein the predetermined positional relationship includes a position range determined based on the eye gaze, the position range including an area having a boundary that has the predetermined positional relationship away from a position on a display surface receiving the eye gaze,
wherein the certain requirement being that the highlight target candidate is of a particular importance within the position range, such that a display element having the particular importance within the position range is selected to be highlighted over a display element more closely corresponding to a direction of the eye gaze to direct the user's gaze towards the display element having the particular importance, and
wherein the particular importance is based on metadata corresponding to the highlight target candidate.

21. A non-transitory computer-readable recording medium storing a control program for causing a computer to execute a display control method, the display control method comprising:
- acquiring eye gaze information concerning eye gaze of a user;
- specifying, as a highlight target display element, among at least one display element to be displayed based on data indicating at least one item of information, a display element that has a predetermined positional relationship with the eye gaze of the user indicated by the eye gaze information and that satisfies a certain requirement as a highlight target candidate; and
- performing display control so that the specified highlight target display element is highlighted,
- wherein the predetermined positional relationship includes a position range determined based on the eye gaze, the position range including an area having a boundary that has the predetermined positional relationship away from a position on a display surface receiving the eye gaze,
- wherein the certain requirement being that the highlight target candidate is of a particular importance within the position range, such that a display element having the particular importance within the position range is selected to be highlighted over a display element more closely corresponding to a direction of the eye gaze to direct the user's gaze towards the display element having the particular importance, and
- wherein the particular importance is based on metadata corresponding to the highlight target candidate.

* * * * *